US012798566B1

(12) United States Patent
Ge et al.

(10) Patent No.: US 12,798,566 B1
(45) Date of Patent: Nov. 17, 2026

(54) TRAJECTORY DETERMINATION AND COLLISION DETECTION BASED ON STEERING ANGLES

(71) Applicant: Zoox, Inc., Foster City, CA (US)

(72) Inventors: Xinyi Ge, Los Gatos, CA (US); Angel Alejandro Martir, Oakland, CA (US); Aviral Singh, Foster City, CA (US); Joshua Axel Seymour Stubbs, San Francisco, CA (US); Aravind Sarma Vadali, Seattle, WA (US); Andrew Zhang, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 51 days.

(21) Appl. No.: 18/933,560

(22) Filed: Oct. 31, 2024

(51) Int. Cl.
*B60W 30/095* (2012.01)
*B60W 30/09* (2012.01)

(52) U.S. Cl.
CPC ........ *B60W 30/0953* (2013.01); *B60W 30/09* (2013.01); *B60W 2530/201* (2020.02); *B60W 2540/18* (2013.01); *B60W 2554/80* (2020.02); *B60W 2710/207* (2013.01)

(58) Field of Classification Search
CPC ............. B60W 30/0953; B60W 30/09; B60W 2530/201; B60W 2540/18; B60W 2554/80; B60W 2710/207
USPC ........................................................... 701/41
See application file for complete search history.

(56) References Cited

U.S. PATENT DOCUMENTS

2014/0041884 A1* 2/2014 Zhu ......................... E02F 3/765 701/50
2014/0128216 A1* 5/2014 Qin ....................... B60W 10/08 310/78
2022/0234581 A1* 7/2022 Kim .................. B60W 30/0956

* cited by examiner

*Primary Examiner* — Yi-Kai Wang
(74) *Attorney, Agent, or Firm* — Lee & Hayes, P.C.

(57) ABSTRACT

A vehicle trajectory and/or trajectory region may be determined based on a steering angle, a steering mode, a length, and/or a width associated with the vehicle. Based on this determined trajectory and/or trajectory region, a collision likelihood measure and/or determination may be generated, which may be used to determine whether the trajectory is safe and/or to inform the driving behavior associated with the vehicle.

20 Claims, 10 Drawing Sheets

TRAJECTORY DETERMINATION AND COLLISION DETECTION BASED ON STEERING ANGLES

BACKGROUND

Safety of passengers in a vehicle and other people or objects in proximity to the vehicle is of the utmost importance. Safety is often predicated on an accurate detection of a potential collision and timely deployment of a safety measure. Autonomous vehicles are often implemented with systems that have highly effective collision detection systems. However, computational resources may limit the ability of vehicle systems to fully account for evolution of environmental states which, in turn, may also limit the operation and effectiveness of such systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
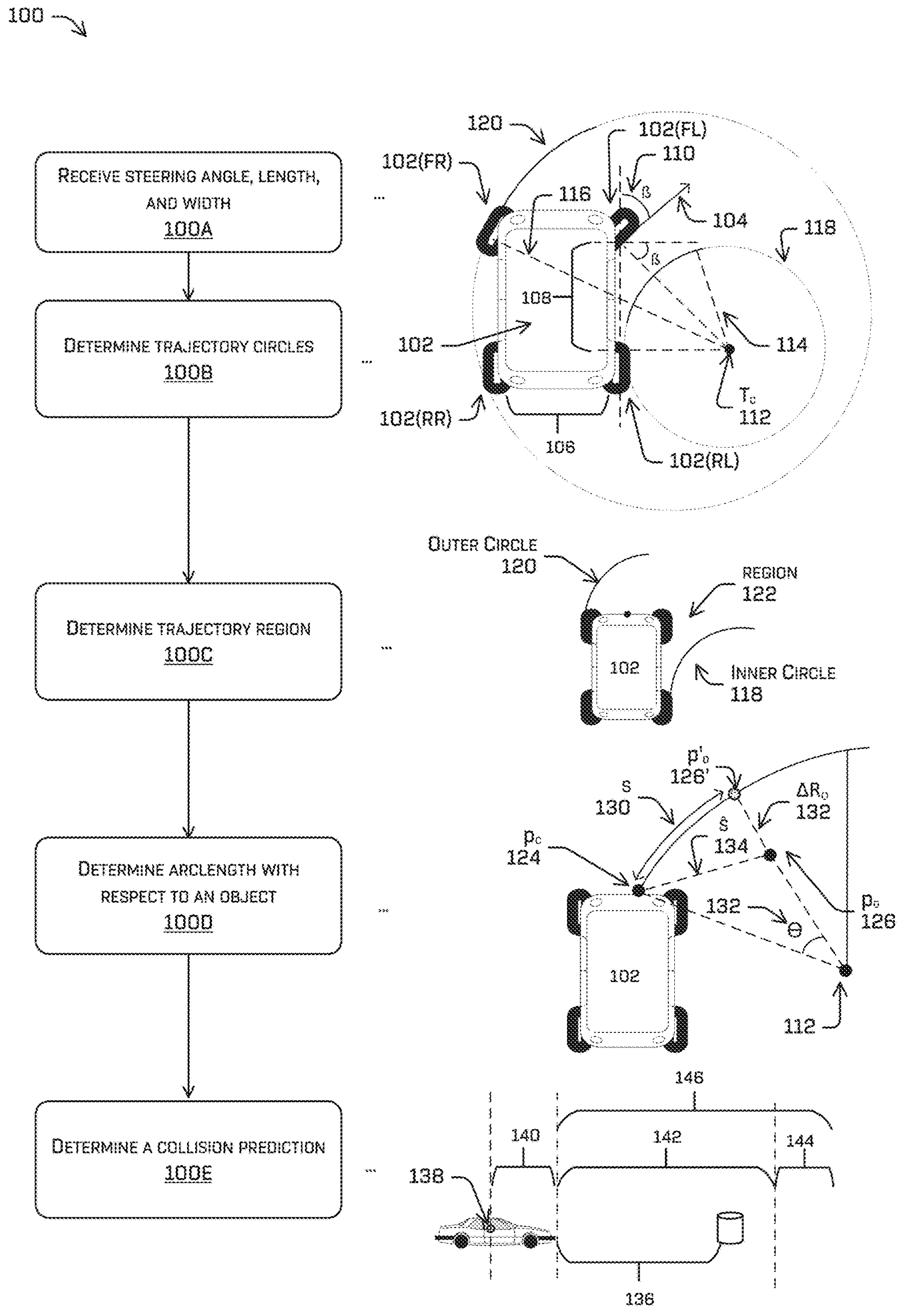
FIG. 1 is a flowchart diagram of an example process for determining a likelihood that a vehicle's trajectory is expected to collide with an object.

This disclosure describes techniques for determining a likelihood that a vehicle's trajectory is expected to intersect with (e.g., collide with) an object in the vehicle's environment. In some cases, the techniques described herein include: (i) determining a trajectory region associated with the vehicle; (ii) determining whether the object is in front of or behind the vehicle, (iii) determining an initial intersection point on the vehicle (e.g., based on whether the object is in front of or behind the vehicle); (iv) determining a distance between the vehicle and the object based on the trajectory region and the object's position, (v) determining an expected stopping distance associated with the vehicle, and/or (vi) determining whether the vehicle's trajectory is expected to intersect with the object based on the determined distance and the expected stopping distance.

While various implementations of the techniques disclosed herein are described with respect to determining the likelihood of a collision between a vehicle and an object, a person of ordinary skill in the relevant technology will recognize that the techniques described herein may be used to determine other safety condition(s) associated with a vehicle (e.g., likelihood of a near miss between a vehicle and an object (e.g., less than a threshold distance between the vehicle and the object), or other safety condition(s) determined based on a proximity of an object and/or a predicted vehicle position as represented by the vehicle's trajectory).

In some cases, the techniques described herein may include determining a trajectory region associated with the vehicle. A trajectory region (e.g., a corridor, a trajectory corridor, and/or the like) may include a portion of the vehicle's environment that the vehicle is expected to stay within if the vehicle follows current steering angle(s) associated with the vehicle. In some cases, the system may determine a trajectory region associated with a vehicle based on at least one of: (i) one or more steering angles (e.g., a front steering angle and/or a rear steering angle) associated with one or more wheels, (ii) a steering mode (e.g., a front-wheel steering mode, a rear-wheel steering mode, a general four-wheel steering mode, and/or a crab steering mode, as further described below) associated with the vehicle, (iii) a width (e.g., a body width) associated with the vehicle (e.g., a width of the vehicle including the wheels, a width of the vehicle excluding the wheels, an average width of the vehicle, and/or the like), or (iv) a length (e.g., a wheelbase, such as the distance between the centers of the front and rear wheels) associated with the vehicle.

In some cases, the trajectory region includes a portion of an environment that is between an "outer trajectory circle" and an "inner trajectory circle." The outer trajectory circle and the inner trajectory circle may be two concentric circles. The radius of the outer trajectory circle may exceed the radius of the inner trajectory circle. The radius of the outer trajectory circle may define a maximum distance from a center point within which the vehicle is expected to remain as the vehicle moves, and the radius of the inner trajectory circle may define a minimum distance from the center point that the vehicle is expected to maintain as the vehicle moves. That is, the vehicle is expected to remain between the inner trajectory circle and the outer trajectory circle as the vehicle moves.

In some cases, determining the trajectory region includes: (i) determining a center point for the two trajectory circles (referred to herein as a "trajectory center point"), (ii) determining the radius of the inner trajectory circle, and/or (iii) determining the radius of the outer trajectory circle. In some cases, determining the trajectory center point, the inner circle radius, and/or the outer circle radius may be based on a length, a width, a steering angle, and/or a steering mode associated with the vehicle. A steering angle may be an angle of one or more wheels of the vehicle with respect to an axis associated with the vehicle (e.g., an axis that is parallel and/or substantially parallel to the width and/or wheelbase of the vehicle). In some cases, the system can use different techniques for determining the trajectory center point, the inner circle radius, and/or the outer circle radius associated with a vehicle depending on the steering mode used by the vehicle.

For example, in some cases, if the vehicle is using a two-wheel steering mode (e.g., a front-wheel steering mode or a rear-wheel steering mode), the system may determine the trajectory center point based on the following equation:

$$T_c = \left(\frac{L}{\tan\beta}, L\right). \quad \text{(Equation 1)}$$

In this equation: (i) $T_c$ is the trajectory center point, $$\frac{L}{\tan\beta} \quad \text{(ii)}$$

is the horizontal component of the trajectory center point, (iii) L is the length associated with the vehicle and the vertical component of the trajectory center point, and (iv) β is the steering angle associated with the vehicle (e.g., a steering angle associated with the front wheels in a front-wheel steering mode or a steering angle associated with the rear wheels in a rear-wheel steering mode). As used herein, a horizontal component is a component determined with respect to a horizontal axis and a vertical component is a component determined with respect to a vertical axis. The horizontal axis may be defined with respect to a coordinate system: (i) whose origin is at a point that is substantially at a center point of the vehicle and/or the vehicle region (e.g., the vehicle's bounding box), and/or (ii) whose horizontal axis is parallel to a horizontal and/or lateral edge of the vehicle region. The vertical axis may be defined with respect to a coordinate system: (i) whose origin is at a point that is substantially at a center point of the vehicle and/or the vehicle region (e.g., the vehicle's bounding box), and/or (ii) whose vertical axis is parallel to a longitudinal and/or vertical edge of the vehicle region.

In some cases, if the vehicle is using a two-wheel steering mode, the inner trajectory circle may be a circle centered at the trajectory center point and/or with a radius determined based on the following equation:

$$R_{INNER} = \frac{L}{\tan\beta}. \quad \text{(Equation 2)}$$

In this equation, (i) $R_{INNER}$ is the radius of the inner trajectory circle, (ii) L is the length associated with the vehicle, and (iii) β is the steering angle associated with the vehicle.

In some cases, if the vehicle is using a two-wheel steering mode, the outer trajectory circle may be a circle centered at the trajectory center point and/or with a radius determined based on the following equation:

$$R_{OUTER} = \sqrt{\left(\frac{L}{\tan\beta} + W\right)^2 + L^2}, \quad \text{(Equation 3)}$$

In this equation, (i) $R_{OUTER}$ is the radius of the outer trajectory circle, (ii) L is the length associated with the vehicle, (iii) β is the steering angle associated with the vehicle, and (iv) W is the width associated with the vehicle. A two-wheel steering may be: (i) a front-wheel steering mode in which a change in the vehicle's steering directly affects the front wheels, and the rear wheels are adjusted according to the change in the front wheel's steering mode, and/or (ii) a rear-wheel steering mode in which a change in the vehicle's steering directly affects the rear wheels, and the front wheels are adjusted according to the change in the rear wheel's steering mode.

As another example, if the vehicle is using a general four-wheel steering mode, the system may determine the trajectory center point based on the following equation:

$$T_C = \left(\frac{L}{\tan\beta_R - \tan\beta_F}, L\frac{\tan\beta_R}{\tan\beta_R - \tan\beta_F}\right). \quad \text{(Equation 4)}$$

In this equation: (i) $T_c$ is the trajectory center point, $$\frac{L}{\tan\beta_R - \tan\beta_F}, \quad \text{(ii)}$$

is the horizontal component of the trajectory center point, (iii)

$$L\frac{\tan\beta_R}{\tan\beta_R - \tan\beta_F} \quad \text{(iii)}$$

is the vertical component of the trajectory center point, (iv) L is the length associated with the vehicle, (v) $\beta_F$ is the steering angle associated with a first subset of the wheels (e.g., the front wheels) of the vehicle, and/or (vi) $\beta_R$ is the steering angle associated with a second subset of the wheels (e.g., the rear wheels) of the vehicle.

In some cases, if the vehicle is using a general four-wheel steering mode, the system may determine: (i) the inner trajectory circle as a circle centered at the trajectory center point and/or whose radius is determined based on the equation $$R_{INNER} = \sqrt{T_{cx}^2 + T_{cy}^2}, \quad \text{(Equation 5)}$$

and/or (ii) the outer trajectory circle as a circle centered at the trajectory center point and/or whose radius is determined based on the equation $$R_{OUTER} = \sqrt{(T_{cx} + W)^2 + (L - T_{cy})^2}. \quad \text{(Equation 6)}$$

In these two equations: (i) $R_{INNER}$ is the radius of the inner trajectory circle, (ii) $R_{OUTER}$ is the radius of the outer trajectory circle, $$T_{cx} = \frac{L}{\tan\beta_R - \tan\beta_F} \quad \text{(iii)}$$

as described in relation to Equation 4, (iv)

$$T_{cy} = L\frac{\tan\beta_R}{\tan\beta_R - \tan\beta_F} \quad \text{(iv)}$$

as described above in relation to Equation 4, (v) L is the length associated with the vehicle, and (vi) W is the width associated with the wheel.

In some cases, a general four-wheel mode is one in which: (i) a change in the vehicle's steering affects the steering angle of all (e.g., both front and rear) wheels of the vehicle, and/or (ii) the steering angle of a first subset of the wheels (e.g., front wheels) is different from the steering angle of a second subset of the wheels (e.g., rear wheels) (e.g., a general four-wheel steering mode is one in which Bp #BR and/or in which the front and rear steering angles are distinct).

As another example, if the vehicle is using a crab steering mode (e.g., a four-wheel steering mode in which the front-wheel steering angle and the rear-wheel steering angle are the same and/or within a threshold deviation), the system may determine the trajectory center point based on the following equation: $T_c$=<$R_{MAX}$*cos β, −$R_{MAX}$*sin β> (Equation 7). In this equation: (i) $T_c$ is the trajectory center point, (ii) $R_{MAX}$*cos β, is the horizontal component of the trajectory center point, (iii) −$R_{MAX}$*sin β is the vertical component of the trajectory center point, (iv) $R_{MAX}$ is a radius of a predetermined circle (e.g., as further described below), and (v) β is the steering angle associated with the wheels (e.g., both front and rear wheels) of the vehicle. In some cases, if the vehicle is using a general four-wheel steering mode, the system may determine: (i) the inner trajectory circle as a circle centered at the trajectory center point and/or whose radius is determined based on the equation $$R_{INNER} = \sqrt{T_{cx}^2 + T_{cy}^2}, \quad \text{(Equation 8)}$$

and/or (ii) the outer trajectory circle as a circle centered at the trajectory center point and/or whose radius is determined based on the equation $$R_{OUTER} = \sqrt{(T_{cx} + W)^2 + (L - T_{cy})^2}. \quad \text{(Equation 9)}$$

In these two equations: (i) $R_{INNER}$ is the radius of the inner trajectory circle, (ii) $R_{OUTER}$ is the radius of the outer trajectory circle, (iii) $T_{cx}$=$R_{MAX}$·cos β as described in relation to Equation 7, (iv) $T_{cy}$=−$R_{MAX}$·sin β as described above in relation to Equation 7, (v) L is the length associated with the vehicle, and (vi) W is the width associated with the wheel.

In some cases, the crab steering mode is a four-wheel steering mode in which all of the wheels are associated with the same steering angle and/or with steering angles that all fall within a threshold deviation of each other (e.g., in which the front-wheel steering angle and the rear-wheel steering angle are the same and/or within a threshold deviation, in which $β_F$=$β_R$, in which $β_F$=$β_R$+/−threshold deviation (e.g., +/−0.5 degrees, 1 degree, 3 degrees, etc.), and/or the like). In some cases, the movement of a vehicle in a crab steering mode is linear and/or substantially linear, while the trajectory represented by one or more trajectory circles is curved. Accordingly, in some cases, the trajectory center point associated with a crab steering mode is determined based on $R_{MAX}$, which may be the radius of a predetermined circle. The predetermined circle may be a circle that is large enough such that an error associated with the circle falls below a threshold. The error may represent a difference between a curvature associated with the predetermined circle and a linear trajectory. The curvature associated with the circle may represent a curvature of a portion of the predetermined circle that falls within a defined region (e.g., a threshold distance of a vehicle position, such as a threshold distance of a current and/or latest vehicle position). For example, the error may represent a difference between: (i) a trajectory represented by the curvature of the portion of the predetermined circle that falls within the threshold distance of the vehicle's position, and (ii) a linear trajectory that the vehicle will actually follow given the current steering angle(s) associated with the vehicle. In some cases, the error associated with using a circle to represent a linear trajectory may decrease as the radius of the circle increases. Accordingly, the predetermined circle should have a "sufficiently large" radius. In some cases, the radius of the predetermined circle may be determined based on a velocity of the vehicle and/or a steering angle of the vehicle. For example, as the velocity and/or the steering angle increases, the radius of the predetermined circle may also increase in relation (e.g., proportionately or according to a function) to the change in velocity and/or steering angle.

In some cases, the techniques described herein include determining whether an object in a vehicle's environment is behind the vehicle or in front of the vehicle. An object may be determined to be behind a vehicle if the object is determined to be located in an area that extends in the opposite direction of the vehicle's current or most recent motion and/or direction of travel. An object may be determined to be in front of the vehicle if the object is determined to be located in an area that extends in the direction of the vehicle's travel direction. Determining whether an object is behind or in front of the vehicle may be relevant, for example, for determining an initial intersection point associated with the vehicle (e.g., as further described below).

In some cases, to determine whether an object is behind the vehicle or in front of the vehicle, the system: (i) determines a "projected intersection point" associated with the object's position and a vehicle region (e.g., the vehicle's bounding box) associated with the vehicle, (ii) determines an "object projection vector" based on the projected intersection point, and (iii) determines whether the object is behind the vehicle or in front of the vehicle based on the object projection vector. The projected intersection point may be a point resulting from projecting the object's position along a curve that is parallel to the vehicle's trajectory region and/or parallel to trajectory circle(s) until the projection intersects with the vehicle region. The object projection vector may be the vector that intersects with both the object position and the projected intersection point.

Accordingly, in some cases, to determine whether an object is behind the vehicle or in front of the vehicle, the system: (i) projects the object's position along a curve that is parallel to the vehicle's trajectory region and/or parallel to trajectory circle(s) until a "projected intersection point" in which the projection intersects with a vehicle region (e.g., the vehicle's bounding box), (ii) determines an "object projection vector" as a vector that intersects with both the object position and the projected intersection point as determined in (i), and (iii) determines whether the object is behind the vehicle or in front of the vehicle based on the object projection vector. In some cases, projecting an object's position along the vehicle trajectory includes projecting the object's position counter-clockwise if the vehicle trajectory is right-leaning (e.g., is expected to include a right turn and/or include a rightward deviation from a current and/or latest vehicle position) and/or projecting the object's position clockwise if the vehicle trajectory is left-leaning (e.g., is expected to include a left turn and/or include a leftward deviation from a current and/or latest vehicle position).

In some cases, the system determines whether the object is behind the vehicle or in front of the vehicle based on the object projection vector and a motion vector representing a direction of the vehicle's travel direction (e.g., as determined based on the steering angle(s) associated with the vehicle). For example, the system may determine whether the object is behind the vehicle or in front of the vehicle based on a dot product of the object projection vector and the motion vector. In some cases, the system may: (i) determine that the object is in front of the vehicle if the dot product of the object projection vector and the motion vector is negative, and/or (ii) determine that the object is behind the vehicle if the dot product of the object projection vector and the motion vector is positive.

In some cases, the techniques described herein include determining an initial intersection point associated with a vehicle with respect to an object. A vehicle's initial intersection point may represent a point in which the vehicle is expected to first collide with the object if the vehicle follows the current trajectory (e.g., the trajectory associated with the trajectory region). In some cases, to determine the initial intersection point associated with a vehicle with respect to an object, the system: (i) determines one or more "edge lines" associated with one or more edges of the vehicle region (e.g., the vehicle's bounding box), (ii) determines one or more "intersecting edges" of the vehicle region in relation to the object position, (iii) determines a "projection circle" based on the object position and the trajectory center point associated with the vehicle, (iv) determines one or more "potential intersection points" based on the point(s) associated with intersection of intersecting edge line(s) and the projection circle, and (v) determines the initial intersection point based on selecting one of the potential intersection point(s).

An intersecting edge may be an edge of the vehicle region (e.g., the vehicle's bounding box) that intersects with a projection of the object position along a curve that is parallel to the vehicle's trajectory region and/or parallel to trajectory circle(s). An edge line may be a straight line that is parallel to the intersecting edge. The projection circle may be a circle that is centered at the trajectory center point and/or whose radius is determined based on a distance between the trajectory center point and the object position. A potential intersection point may be a point associated with intersection of the projection circle and an edge line associated with an intersecting edge of the vehicle.

In some cases, the system determines the initial intersection point based on selecting one of the potential intersection points. For example, in some cases, the system determines the initial intersection point based on the potential intersection point that is closer to the object position. As another example, in some cases, the system determines the initial intersection point based on the potential intersection point whose arclength with respect to the object position is smallest. As another example, in some cases: (i) if the system determines that the object is behind the vehicle, the system determines the initial intersection point based on a potential intersection point that is closer to a rear axis of the vehicle than to a front axis of the vehicle, and/or (ii) if the system determines that the object is in front of the vehicle, the system determines the initial intersection point based on the potential intersection point that is closer to a front axis of the vehicle than to a rear axis of the vehicle.

Accordingly, in some cases, to determine the initial intersection point associated with a vehicle with respect to an object, the system: (i) projects the object's position along a curve that is parallel to the vehicle's trajectory region and/or parallel to trajectory circle(s) until a point in which the projection intersects with an intersecting edge of a vehicle region (e.g., the vehicle's bounding box), (ii) determines intersection point(s) associated with intersection of the edge line parallel to the intersecting edge and a projection circle associated with the circle (e.g., as described below), and/or (iii) determines the initial intersection point based on the determined intersection points. In some cases, the projection circle may be a circle: (i) centered at the trajectory center point associated with the vehicle, and/or (ii) whose radius is determined based on a distance between the trajectory center point and a detected object position.

For example, if an object is located at a position $p_o$ and a vehicle is associated with a trajectory center point $T_c=\langle h, k\rangle$ and a trajectory circle C, the system may project $p_o$ along a curve that is parallel to C (e.g., a curve parallel to C that crosses $p_o$) until the projection intersects with a first horizontal edge of the vehicle's region and/or a first vertical edge of the vehicle's region. The first horizontal edge may be associated with the line $y=Y_A$, while the vertical edge may be associated with the line $x=X_A$. The system may also determine a projection circle centered at $T_c$ whose radius R is determined based on a distance between the $T_c$ and $p_o$. At this point, the system may: (i) use Equations 10-11 described below to determine one or more points at which the projection circle is expected to intersect with the line $y=Y_A$, and/or (ii) use Equations 12-13 to determine one or more points at which the projection circle is expected to intersect with the line $x=X_A$. Operations (i)-(ii) may result in up to four potential intersection points. The system may then, for example, select the intersection point having the shortest arclength with respect to $p_o$ as the initial intersection point.

For example, in some cases, if the projection of the object's position associated with an object A intersects with a horizontal edge of the vehicle region (e.g., such that the edge line is $y=Y_A$, where $Y_A$ is the constant vertical position of the horizontal edge in a coordinate system whose vertical dimension is parallel to the horizontal edge), the vehicle's initial intersection point may be determined based on the following equations:

$$p_1 = \left\langle h - \sqrt{R^2 - (Y_A - k)^2},\ Y_A \right\rangle \quad \text{(Equation 10)}$$

and $$p_2 = \left\langle h + \sqrt{R^2 - (Y_A - k)^2},\ Y_A \right\rangle. \quad \text{(Equation 11)}$$

In these equations: (i) $p_1$ and $p_2$ are two potential intersection points, (ii)

$$h - \sqrt{R^2 - (Y_A - k)^2}$$

is the horizontal component of $p_1$, (iii)

$$h + \sqrt{R^2 - (Y_A - k)^2}$$

is the horizontal component of $p_2$, (iv) $Y_A$ is the vertical coordinate of the horizontal edge intersecting with the projected intersection point of the object A, (v) R is the distance between trajectory center point associated with the vehicle and the object position, (vi) h is the horizontal component of the trajectory center point, and/or (v) k is the vertical component of the trajectory center point.

In some cases, if the projection of the object's position associated with an object A intersects with a vertical edge of the vehicle region (e.g., such that the edge line is $x=X_A$, where $X_A$ is the constant horizontal position of the vertical edge in a coordinate system whose horizontal dimension is parallel to the horizontal edge), the vehicle's initial intersection point may be determined based on the following equations:

$$p_1 = \left\{X_A,\, k - \sqrt{R^2 - (X_A - h)^2}\right\} \quad \text{(Equation 12)}$$

and $$p_2 = \left\{X_A,\, k + \sqrt{R^2 - (Y_A - h)^2}\right\}. \quad \text{(Equation 13)}$$

In these equations: (i) $p_1$ and $p_2$ are two potential intersection points, (ii)

$$k - \sqrt{R^2 - (X_A - h)^2}$$

is the vertical component of $p_1$, (iii)

$$k + \sqrt{R^2 - (X_A - h)^2}$$

is the vertical component of $p_2$, (iv) $X_A$ is the horizontal coordinate of the vertical edge intersecting with the projected intersection point of the object A, (v) R is the distance between trajectory center point associated with the vehicle and the object position, (vi) h is the horizontal component of the trajectory center point, and/or (v) k is the vertical component of the trajectory center point.

In some cases, the techniques described herein include determining a distance associated with a vehicle and an object based on an initial intersection point associated with the vehicle, an object position associated with the object, and/or a trajectory region associated with the vehicle. In some cases, to determine a distance associated with a vehicle and an object, the system (i) projects the object position onto a "trajectory curve" that is parallel to (e.g., equidistant from) the trajectory region and/or the trajectory circle(s) associated with the vehicle to determine a "projected object position," (ii) determines an arclength associated with the projected object position and the vehicle's initial intersection point, (iii) determines a "projection distance" representing a distance between the object position and the projected object position, (iv) determines a horizontally-adjusted distance based on the determined arclength and the projection distance, and/or (v) determines the distance associated with vehicle and/or the object based on the projected object position, the projected distance, the arclength associated with the projected object position, and/or the horizontally-adjusted arc-length. The horizontally-adjusted distance may represent both the curved distance between the initial intersection point and the projected object position as well as the horizontal distance between the actual object position and the initial intersection point. The trajectory curve may be a curve that is parallel to (e.g., equidistant from) the trajectory region and/or the trajectory circle(s). For example, the trajectory curve may be a curve that: (i) is parallel to (e.g., equidistant from) the trajectory region and/or the trajectory circle(s), and/or (ii) crosses a predefined vehicle position (e.g., a center of a front and/or rear bumper of the vehicle, the initial intersection point associated with the vehicle, and/or the like). The projected object position may be the result of projecting the object position onto the trajectory curve.

In some cases, to determine the distance associated with a vehicle and an object, the system first projects the object position onto the trajectory curve. The trajectory curve may be parallel to the trajectory region and/or the trajectory circle(s) associated with the vehicle. For example, the trajectory curve may be a curve that intersects with the initial intersection point associated with the vehicle and is parallel to (e.g., equidistant with respect to) the trajectory region and/or the trajectory circle(s) associated with the vehicle. In some cases, by projecting the object position along a trajectory curve intersecting with the initial intersection point, the system determines a projected object position that is on the same curve as the initial intersection point. In some cases, the system may determine an arclength associated with the initial intersection point and the projected object position, which may represent a "curved distance" between the initial intersection point and the object position. In some cases, the system may determine the arclength using the following equation:

$$s = R \cdot \cos^{-1}\left(\frac{p_o' \cdot p_c}{|p_o'||p_c|}\right). \quad \text{(Equation 14)}$$

In this equation: (i) s is the arclength associated with the initial intersection point and the projected object position, (ii) $p'_o$ is the result of projecting the object position onto the trajectory curve, (iii) $p_c$ is the initial intersection point associated with the vehicle, (iv) · is the dot product notation, and (v) R is the distance associated with (e.g., between) the object position and a trajectory center point associated with the vehicle (e.g., as determined using the techniques described above).

In some cases, the system determines a distance associated with a vehicle and an object based on the horizontally-adjusted distance associated with the vehicle and the object. The horizontally-adjusted distance may be determined based on the arclength associated with the projected object position (e.g., as determined based on the techniques described above) and the initial intersection point associated with the vehicle. In some cases, the horizontally-adjusted distance is determined based on the equation:

$$\hat{s} = \sqrt{s^2 + \Delta R_o^2}. \quad \text{(Equation 15)}$$

In this equation: (i) s is the horizontally-adjusted distance associated with the object and the vehicle, (ii) s is the arclength associated with the vehicle's initial intersection point and the projected object position as determined by projecting the object position onto a trajectory curve intersecting with the initial intersection point (e.g., as determined based on the techniques described above, such as based on Equation 14), and (iii) $\Delta R_o$ is a distance (e.g., the horizontal distance) between the object position and the projected object position. In some cases, the system adopts the horizontally-adjusted distance associated with the vehicle and the object as the distance measure associated with the vehicle and the object.

In some cases (e.g., when the object position is determined to be off of an expected vehicle trajectory and/or when the vehicle is not expected to collide with and/or intersect with the object), the system determines the horizontally-adjusted distance associated with a vehicle point and an object position along a projection circle and/or onto a line that intersects with the vehicle point and the trajectory center point. The vehicle point may be, for example, the initial intersection point associated with the vehicle (e.g., as determined based on the techniques described above), a predefined position of the vehicle, a point of the vehicle that is closest to the object position, and/or a point at a boundary of the vehicle. For example, in some cases, if the object position is to the left of the vehicle position and/or in front of the vehicle (e.g., in the direction of the vehicle's movement), the vehicle point is a point that is substantially at the upper-left boundary of the vehicle. As another example, in some cases, if the object position is to the left of the vehicle position and/or behind vehicle (e.g., against the direction of the vehicle's movement), the vehicle point is a point that is substantially at the lower-left boundary of the vehicle. As another example, in some cases, if the object position is to the right of the vehicle position and/or in front of the vehicle, the vehicle point is a point that is substantially at the upper-right boundary of the vehicle. As another example, in some cases, if the object position is to the right of the vehicle position and/or behind the vehicle, the vehicle point is a point that is substantially at the lower-right boundary of the vehicle.

In some cases, to determine the distance between the vehicle point and the object position, a system first projects the object position along a projection circle and/or onto a line that intersects with the vehicle point and the trajectory center point. This may result in the projected object position. The projection circle may be a circle centered at the trajectory center point whose radius is determined based on a distance between the trajectory center point and the object position. After determining the projected object position onto the projected object position, the system determines a first value, which may represent an arclength of the projection circle between the object position and the projected object position. The system may also determine a second value, which may represent a distance between the projected object position and the vehicle point. The system may determine the distance between the vehicle point and the object position based on a third value, which may for example be determined by applying the Pythagorean theorem to the first and second values (e.g., given a triangle whose hypotenuse length is the third value whose other dimensions are the first and second values). In some cases, the system may determine a likelihood that the vehicle's trajectory (e.g., as determined based on the region and/or the trajectory circle(s)) is unsafe based on the determined distance measure.

In some cases, the techniques described herein include determining a stopping distance associated with a vehicle. In some cases, the system determines the vehicle's stopping distance based on a velocity associated with the vehicle, a brake rate associated with the vehicle, and/or an estimated reaction time associated with the vehicle and/or the vehicle's computing system(s) (e.g., an estimated reaction time of 0.1 seconds). For example, in some cases, the system determines the stopping distance associated with the vehicle based on the equation:

$$d_s = vt_{p-r} - \frac{v^2}{2b}. \quad \text{(Equation 16)}$$

In this equation: (i) $d_s$ is the vehicle's stopping distance, (i) v is the vehicle's velocity, (iii) b is the vehicle's brake rate (e.g., deceleration rate from braking), and/or (iv) $t_{p-r}$ is the vehicle's estimated reaction time. Example techniques for determining the vehicle's brake rate are described in U.S. patent application Ser. No. 18/821,195, entitled "Generating Trajectories for Transitioning from Decelerations" and filed on Aug. 30, 2024, which is incorporated by reference herein in its entirety and for all purposes.

In some cases, the techniques described herein include determining a likelihood that a vehicle's trajectory is expected to intersect with (e.g., collide with) an object based on: (i) a distance associated with the object and the vehicle (e.g., as determined using the techniques described above), and (ii) a stopping distance associated with the vehicle. For example, in some cases, the system determines that the vehicle's trajectory is expected to intersect with an object if the stopping distance exceeds and/or does not fall below the distance associated with the vehicle and the object. As another example, in some cases, the system determines that the vehicle's trajectory is expected to intersect with an object if the stopping distance exceeds and/or does not fall below the sum of: (i) distance associated with the vehicle and the object, and (ii) a buffer distance. The buffer distance may be a predefined value and/or a value determined based on one or more vehicle characteristics (e.g., based on an available electric energy level associated with the vehicle).

Accordingly, in some cases, the techniques described herein include determining whether a vehicle's trajectory is expected to intersect with an object based on a trajectory region determined based on the vehicle's steering angle(s), width, length, and/or steering mode. In some cases, these techniques provide a computationally-efficient method of collision detection that may, for example, be used by a vehicle in a resource-constrained operating mode and/or by a resource-constrained computing platform associated with the vehicle. An example of a resource-constrained computing platform is a low-level controller associated with the vehicle. Examples of low-level controllers are described in U.S. patent application Ser. No. 18/744,049, entitled "Supervised Execution of Software Applications on Vehicle Computing Devices" and filed on Jun. 14, 2024, which is incorporated by reference herein in its entirety and for all purposes. For example, in some cases, during a resource-constrained operating mode, a low-level controller associated with a vehicle may perform collision detection using the techniques described herein. The resource-constrained operating mode may, for example, be activated when a vehicle's electric energy level falls below a threshold, a vehicle computing system's processing and/or storage capacity falls below a threshold, a vehicle's fuel level falls below a threshold, and/or the like.

In some cases, the techniques described herein may be implemented in the context of a vehicle including a primary system for generating data to control the vehicle and a secondary system that validates the data and/or other data to avoid collisions. In some cases, the techniques described herein may be used by a secondary system to determine whether to validate a trajectory generated by the primary system based on whether the candidate trajectory is expected to collide with any objects in the future. In some cases, the secondary system may perform the operations described herein to determine a likelihood that a vehicle's trajectory collides with an object. Exemplary operations of the secondary system are described in US Patent Application Publication No. 20200211394, entitled "Collision Avoidance System," which is incorporated by reference herein in its entirety and for all purposes. In some cases, the techniques described herein enable determinations about trajectory safety (e.g., trajectory collision likelihoods) when the vehicle is operating in a low-speed mode (e.g., where the vehicle's speed falls below a threshold and/or has a defined lower-bound that is below the maximal speed associated with the vehicle) and/or during manual control of the vehicle. For example, the techniques described herein may be implemented in the context of low-speed manual control of the vehicle.

In some cases, the techniques described herein improve the safety of a vehicle and/or a vehicle computing system by detecting a likelihood of intersection between the vehicle's trajectory and an object detected in the vehicle's environment. For example, as described above, the techniques described herein may enable determining whether a vehicle's trajectory is expected to intersect with an object based on a trajectory region determined based on the vehicle's steering angle(s), width, length, and/or steering mode. By detecting the vehicle's trajectory is expected to intersect with an object, the vehicle computing system can take preventative action(s) to avoid the collision and/or mitigate its impact, thereby improving the safety of the vehicle and/or its occupants. Examples of preventive action(s) may include automatically applying the brakes, steering to avoid the object, deploying airbags and/or other safety systems, alerting the driver, and/or enabling autonomous and/or semiautonomous control of the vehicle. Examples of preventive actions are described in US Pat. App. Pub. No. 20240051573, entitled "Systems and Methods for Controlled Deceleration" and filed on Aug. 15, 2022 and/or in US Pat. App. Pub. No. 20240034308, entitled "Systems and Methods for Rapid Deceleration" and filed on Jul. 7, 2022, both of which are incorporated by reference herein in their entirety and for all purposes.

In some cases, the techniques described herein increase the redundancy of a vehicle computing device by equipping the device with two components for trajectory validation and/or collision detection (e.g., a first trajectory validation and/or collision detection associated with a high-level vehicle controller and a second trajectory validation and/or collision detection component associated with a low-level vehicle controller). In some cases, if one of those components fails, the other can take over, which increases the reliability of the vehicle computing device. This redundancy approach provides an additional layer of safety and continuity in the trajectory validation process. If a safety condition is detected or if a trajectory needs to be verified, both trajectory validation components work in parallel to independently assess and validate the trajectory. This simultaneous validation process increases the system's confidence in the accuracy and reliability of the trajectory, as any discrepancies or inconsistencies between the two components can be detected and resolved. Moreover, in the event of a failure in one of the components, the remaining component can continue performing trajectory validation without interruption, ensuring the vehicle's operations remain secure and unaffected by the failure.

In some cases, the techniques described herein increase the computational efficiency of performing trajectory validation and/or collision detection for a vehicle. In some cases, the techniques described herein enable performing trajectory validation and/or collision detection using geometric operations that are more computationally efficient than other trajectory validation and/or collision detection techniques (e.g., machine-learning-based trajectory validation and/or collision detection techniques). Accordingly, in some cases, the techniques described herein enable performing trajectory validation and/or collision detection using a fewer amount of computational resources, thereby improving the computational efficiency of performing trajectory validation and/or collision detection.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 is a flowchart diagram of an example process 100 for determining a likelihood that a vehicle's trajectory is expected to collide with an object. As depicted in FIG. 1, at operation 100A, an example system receives a length, width, and a steering angle associated with the vehicle. For example, as depicted in FIG. 1, the vehicle 102 is associated with the width 106, the length 108, and the steering angle 110.

The length associated with the vehicle may be a distance associated with a front axle and a rear axle of the vehicle. The front axle may be associated with the front wheel(s) of the vehicle, while the rear axle may be associated with the rear wheel(s) of the vehicle. For example, as depicted in FIG. 1, the length 108 associated with the vehicle 102 is determined based on: (i) the axle associated with the front-right wheel 102(FR) and the front-left wheel 102(FL), and (ii) the axle associated with the rear-right wheel 102(RR) and the rear-left wheel 102(RL). In some cases, the length associated with the wheel is determined based on the vehicle's wheelbase.

The width associated with the vehicle may be a point in a left portion of the vehicle (e.g., a left-most point of the vehicle, a left-most point of the vehicle excluding one or more vehicle components such as one or more mirrors, a point on a left fender and/or panel of the vehicle, and/or the like) and a point in a right portion of the vehicle (e.g., a right-most portion of the vehicle, a right-most portion of the vehicle excluding one or more vehicle components such as one or more mirrors, a point on a right fender and/or panel of the vehicle, and/or the like). For example, as depicted in FIG. 1, the width 106 associated with the vehicle 102 may include a distance between outer edges of the front-right wheel 102(FR) and the front-left wheel 102(FL) and/or a distance between outer edges of the rear-right wheel 102(RR) and the rear-left wheel 102(RL).

A steering angle may be an angle associated with: (i) a steering vector associated with a wheel of the vehicle, and (ii) a vertical or horizontal axis of the vehicle. For example, a steering angle may be the smaller of: (i) an angle associated with a wheel's steering vector and a horizontal axis of the vehicle, or (ii) an angle associated with a wheel's steering vector and a vertical axis of the vehicle. The steering vector may represent a direction in which the wheel(s) are pointed. In some cases, the steering vector is a vector associated with one or more "active wheels" of the vehicle and a vehicle's axis. An active wheel of the vehicle may be a wheel that is being directly controlled by the vehicle's steering system, such as a front wheel in a front-wheel steering mode, a rear wheel in a rear-wheel steering mode, and either a front wheel or a rear wheel in a general four-wheel steering mode and/or a crab steering mode.

Figure 2:
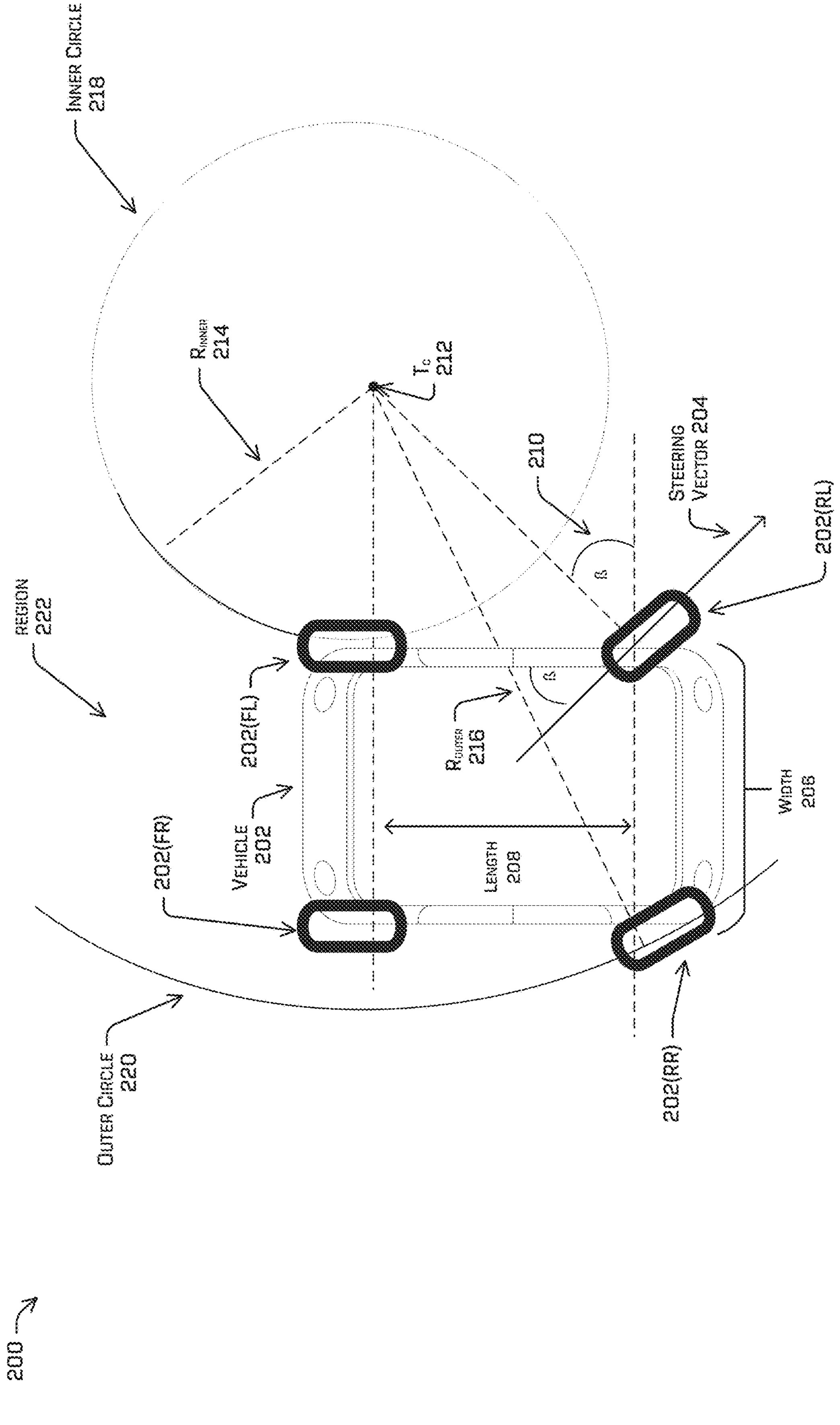
FIG. 2 provides an operational example of determining the trajectory region associated with a vehicle that is moving based on a rear-wheel steering mode.
Figure 3:
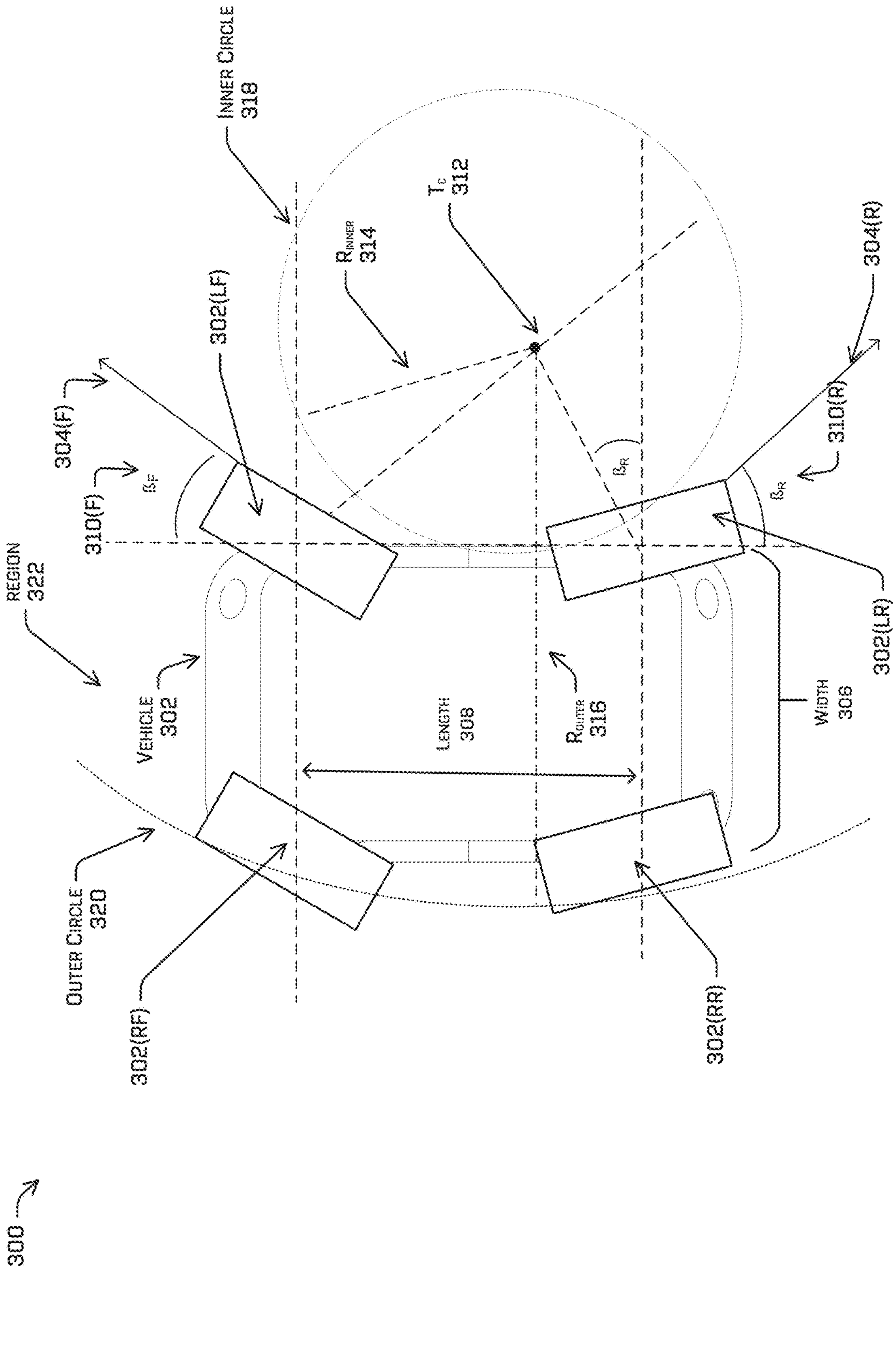
FIG. 3 provides an operational example of determining the trajectory region associated with a vehicle that is moving based on a general four-wheel steering mode.
Figure 4:
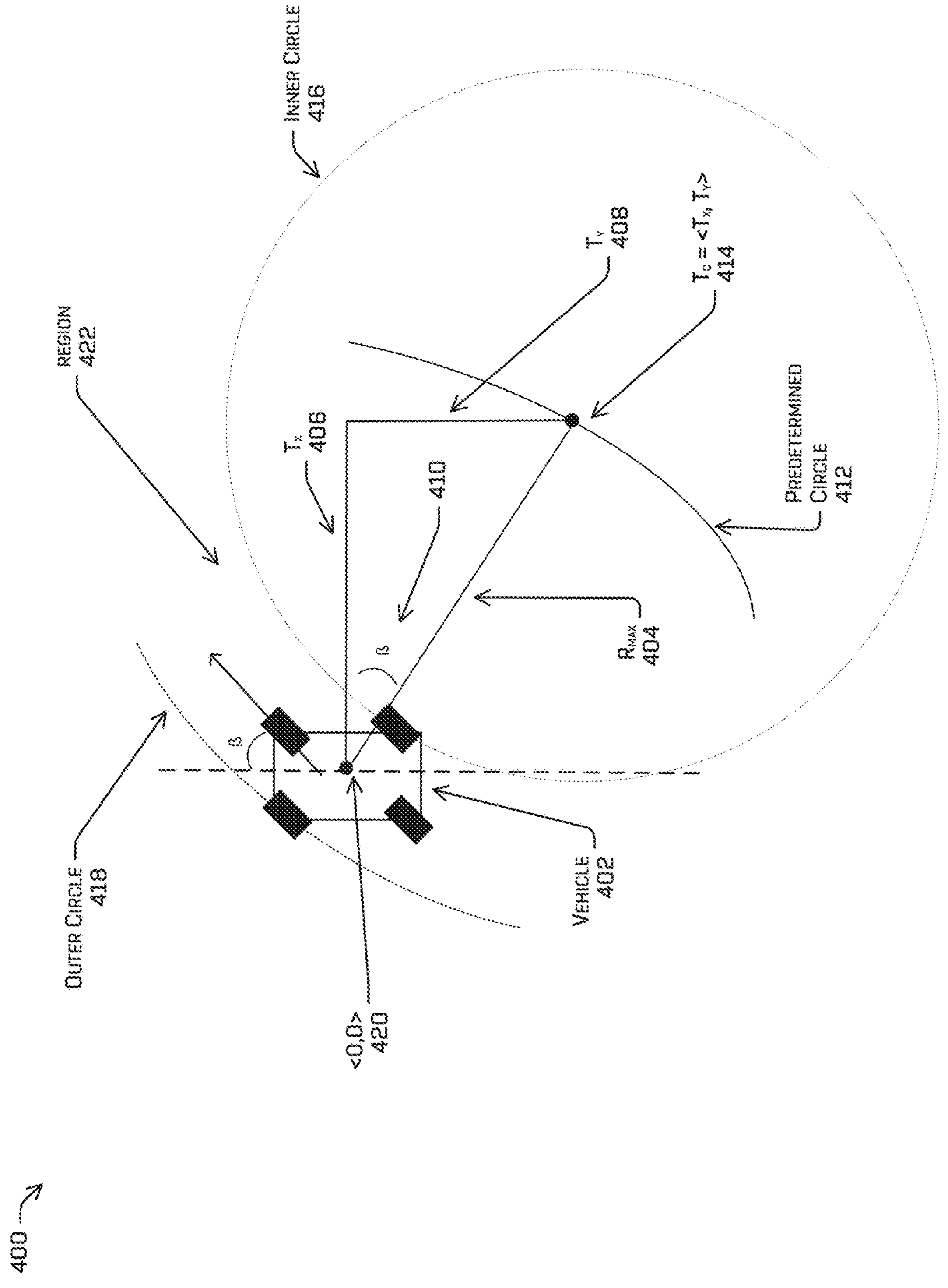
FIG. 4 provides an operational example of determining the trajectory region associated with a vehicle that is moving based on a crab steering mode.

Accordingly, in some cases, a vehicle may be associated with a number of steering angles and those steering angles may be associated with all or a subset of the vehicle's wheels (including a single wheel). The example depicted in FIG. 1 includes a vehicle in a front-wheel steering mode, which is a two-wheel steering mode in which the front wheels are the active wheels that are being directly controlled by the vehicle's steering system. In the operational example of FIG. 1, given that the vehicle 102 is in a front-wheel steering mode, the steering angle 110 (β) is an angle determined based on a steering vector 104 associated with the front wheels (e.g., with the front-right wheel 102(FR) and/or the front-left wheel 102(FL)). Examples of steering angle(s) associated with rear-wheel steering modes, general four-wheel steering modes, and crab steering modes are depicted in FIGS. 2-4.

At operation 100B, the system determines one or more trajectory circle(s) based on the steering angle, the length, and the width. For example, the system may combine the steering angle (β), the length (L), and the width (W): (i) based on Equation 1 to determine a trajectory center point, (ii) based on Equation 2, to determine an inner radius ($R_{INNER}$), and (iii) based on Equation 3, to determine an outer radius ($R_{OUTER}$). The trajectory circle(s) may include an inner trajectory circle centered at the trajectory center point and with the inner radius, and/or an outer trajectory circle centered at the trajectory center point and with the outer radius.

For example, as depicted in FIG. 1, the system may combine the length 108 (L) and the steering angle 110 (β), for example using Equation 1 described above, to determine the trajectory center point 112 ($T_C$). Additionally, the system may combine the length 108 (L) and the steering angle 110 (β), for example using Equation 2 described above, to determine the inner radius 114 ($R_{INNER}$). Additionally, the system may combine the width 106 (W), the length 108 (L), and the steering angle 110 (β), for example using Equation 3 described above, to determine the outer radius 116 ($R_{OUTER}$). The system may then determine the inner trajectory circle 118 as the circle centered at trajectory center point 112 ($T_C$) and with the inner radius 114. Additionally, the system may determine the outer trajectory circle 120 as the circle centered at trajectory center point 112 ($T_C$) and with the outer radius 116.

At operation 100C, the system determines the trajectory region based on the trajectory circle(s). In some cases, the system may determine the trajectory region as a portion of the environment that falls between an outer trajectory circle and an inner trajectory circle. For example, as depicted in FIG. 1, the trajectory region 122 includes a portion of the environment that falls between the outer trajectory circle 120 and the inner trajectory circle 118.

At operation 100D, the system determines a horizontally-adjusted distance associated with the vehicle and the object. The horizontally-adjusted distance may be associated with: (i) an initial intersection point associated with the vehicle, (ii) a projected object position resulting from projecting the object position onto a curve parallel to the trajectory region (e.g., a curve parallel to the trajectory curve that crosses the initial intersection point), and (iii) a distance between the object position and the projected object position. Example techniques for determining the initial intersection point are described above and/or below in relation to FIG. 6.

In some cases, to determine the horizontally-adjusted distance associated with the vehicle and the object, the system first projects the object position onto a curve that is parallel to the trajectory region, for example a curve parallel to the trajectory curve that crosses the initial intersection point. For example, as depicted in FIG. 1, the system projects the object position 126 ($p_o$) onto a curve that is parallel to the trajectory region 122 and/or crosses the initial intersection point 124 ($p_c$). The result of this projection is the projected object position 126' ($p'_o$).

In some cases, after determining the projected object position, the system determines an arclength(s) associated with the initial intersection point ($p_c$) and the projected object position ($p'_o$), for example using the Equation 14 described above. For example, as depicted in FIG. 1, the system may determine the arclength 130 (s) based on the initial intersection point 124 ($p_c$) and projected object position 126' ($p'_o$), for example using the Equation 14 described above.

In some cases, after determining the arclength(s) associated with the initial intersection point ($p_c$) and the projected object position ($p'_o$), the system determines the horizontally-adjusted distance ($\hat{s}$) based on the arclength(s) and a horizontal distance ($\Delta R_o$) between the object position ($p_o$) and the projected object position ($p'_o$), for example using the Equation 15 described above. For example, as depicted in FIG. 1, the system may determine the horizontally-adjusted distance 134 ($\hat{s}$) based on the arclength 130 (s) and a horizontal distance 132 ($\Delta R_o$) between the object position 126 ($p_o$) and the projected object position 126' ($p'_o$), for example using the Equation 15 described above.

The operational example presented in FIG. 1 and/or in relation to operation 100D provides an example of determining a distance between a vehicle and an object. A person of ordinary skill in the relevant technology will recognize that this distance determination may be performed using other techniques. For example, in some cases (e.g., when the object position is determined to be off of an expected vehicle trajectory and/or when the vehicle is not expected to collide with and/or intersect with the object), the distance may be determined using the techniques described below in relation to FIG. 10.

At operation 100E, the system determines a likelihood that the vehicle's trajectory is expected to intersect with the object based on the horizontally-adjusted distance. In some cases, the system compares: (i) a distance between the object and the vehicle as determined based on the horizontally-adjusted distance, (ii) a stopping distance associated with the vehicle (e.g., as determined using the techniques described above), and (iii) a buffer distance (e.g., as determined using the techniques described above). For example, in some cases, the system may: (i) determine that an intersection (e.g., a collision) is likely and/or more likely if the vehicle-object distance exceeds and/or equals the sum of the stopping distance and the buffer distance, and/or (ii) determine that an intersection (e.g., a collision) is unlikely and/or less likely if the vehicle-object distance falls below the sum of the stopping distance and the buffer distance.

For example, in the operational example depicted in FIG. 1, the system may determine a vehicle-object distance 136 based on the horizontally-adjusted distance 134 ($\hat{s}$). The system may additionally determine a sum 146 of the stopping distance 142 and the buffer distance 144 (e.g., but not the distance 140 between the vehicle's index point 138 and the vehicle's bumper). The system may then that an intersection (e.g., a collision) is likely and/or more likely because the vehicle-object distance 136 exceeds the sum 146 of the stopping distance 142 and the buffer distance 144.

FIG. 2 provides an operational example 200 of determining the trajectory region 222 associated with a vehicle 202 that is moving based on a rear-wheel steering mode. The trajectory region 222 may be used to determine a distance associated with the vehicle 202 and an object and/or to determine whether the trajectory of the vehicle 202 is likely to intersect with an object, for example using the techniques described above.

As depicted in FIG. 2, the vehicle 202 is in a rear-wheel steering mode in which the rear wheels (i.e., the rear-right wheel 202(RR) and the left-rear wheel 202(LR)), and not the front wheels (i.e., the front-right wheel 202(FR) and the front-left wheel 202(FL)), are controlled by the vehicle's steering system. Accordingly, the steering angle 210 (β) may represent an angle between a steering vector 204 associated with the rear wheels and the horizontal axis of the vehicle.

As depicted in FIG. 2, the vehicle 202 is associated with a width 206 (W), a length 208 (L), and the steering angle 210 (β). Based on these values (e.g., and using Equations 1-3), the system may determine the trajectory center point 212 ($T_C$), the inner radius 214 ($R_{INNER}$), and the outer radius 216 ($R_{OUTER}$). The system may determine two trajectory circles both centered at the trajectory center point 212 ($T_C$): an inner circle 218 with the inner radius 214 ($R_{INNER}$) and an outer circle 220 with the outer radius 216 ($R_{OUTER}$). The system may then determine the trajectory region 222 to include a portion of the environment that falls between the inner circle 218 and the outer circle 220.

FIG. 3 provides an operational example 300 of determining the trajectory region 322 associated with a vehicle 302 that is moving based on a general four-wheel steering mode. The trajectory region 322 may be used to determine a distance associated with the vehicle 302 and an object and/or to determine whether the trajectory of the vehicle 302 is likely to intersect with an object, for example using the techniques described above.

As depicted in FIG. 3, the vehicle 302 is in a general four-wheel steering mode in which both the rear wheels (i.e., the rear-right wheel 302(RR) and the left-rear wheel 302(LR)), and the front wheels (i.e., the front-right wheel 302(FR) and the front-left wheel 302(FL)), are controlled by the vehicle's steering system. Accordingly, the vehicle is associated with two steering angles: (i) the front steering angle 310(F) ($\beta_F$) associated with the steering vector 304(F) (e.g., which is associated with the front-right wheel 302(FR) and/or the front-left wheel 302(FL)), and (ii) the rear steering angle 310(R) ($\beta_R$) associated with the steering vector 304(R) (e.g., which is associated with the rear-right wheel 302(RR) and/or the rear-left wheel 302(RL)).

As further depicted in FIG. 3, the vehicle 302 is associated with a width 306(W), a length 308 (L), the front steering angle 310(F) ($\beta_F$), and the rear steering angle 310(R) ($\beta_R$). Based on these values (e.g., and using Equations 4-6), the system may determine the trajectory center point 312 ($T_C$), the inner radius 314 ($R_{INNER}$), and the outer radius 316 ($R_{OUTER}$). The system may determine two trajectory circles both centered at the trajectory center point 312 ($T_C$): an inner circle 318 with the inner radius 314 ($R_{INNER}$) and an outer circle 320 with the outer radius 316 ($R_{OUTER}$). The system may then determine the trajectory region 322 to include a portion of the environment that falls between the inner circle 318 and the outer circle 320.

FIG. 4 provides an operational example 400 of determining the trajectory region 422 associated with a vehicle 402 that is moving based on a crab steering mode. The trajectory region 422 may be used to determine a distance associated with the vehicle 402 and an object and/or to determine whether the trajectory of the vehicle 402 is likely to intersect with an object, for example using the techniques described above.

As depicted in FIG. 4, because the vehicle is associated with the crab steering mode, each of the four wheels of the wheel is associated with a common steering angle 410 (β). Additionally, the system may determine a predetermined circle 412 with a predetermined radius 404 ($R_{MAX}$) and/or predetermined value. Example techniques for determining the predetermined circle and/or the predetermined radius are described above. As described above, in some cases, the predetermined radius 404 ($R_{MAX}$) may be determined to be sufficiently large such that a deviation between linear movement caused by the steering angle 410 (β) and the predetermined radius 404 ($R_{MAX}$) falls below a threshold across a predefined distance.

In some cases, using the steering angle 410 (β) and the predetermined radius 404 ($R_{MAX}$), the system may determine the trajectory center point 414 ($T_C$), for example based on the Equation 7 described above. As depicted in FIG. 4, the trajectory center point 414 ($T_C$) may be associated with the horizontal component 406 ($T_X$) and the vertical component 408 ($T_Y$). Accordingly, the trajectory center point 414 ($T_C$) is $T_X$ units to the right of the from the origin point 420 and $T_Y$ point below the origin point 420.

Based on the determined trajectory center point 414 ($T_C$), the system may determine the inner trajectory circle 416 as a circle centered on the trajectory center point 414 ($T_C$) and with a radius $R_{INNER}$, which may be determined based on Equation 8 described above. Furthermore, the system may determine the outer trajectory circle 418 as a circle centered on the trajectory center point 414 ($T_C$) and with a radius $R_{OUTER}$, which may be determined based on Equation 9 described above. After determining the inner trajectory circle 416 and the outer trajectory circle 418, the system may determine the trajectory region 422 to include a portion of the environment between the inner trajectory circle 416 and the outer trajectory circle 418.

Figure 5:
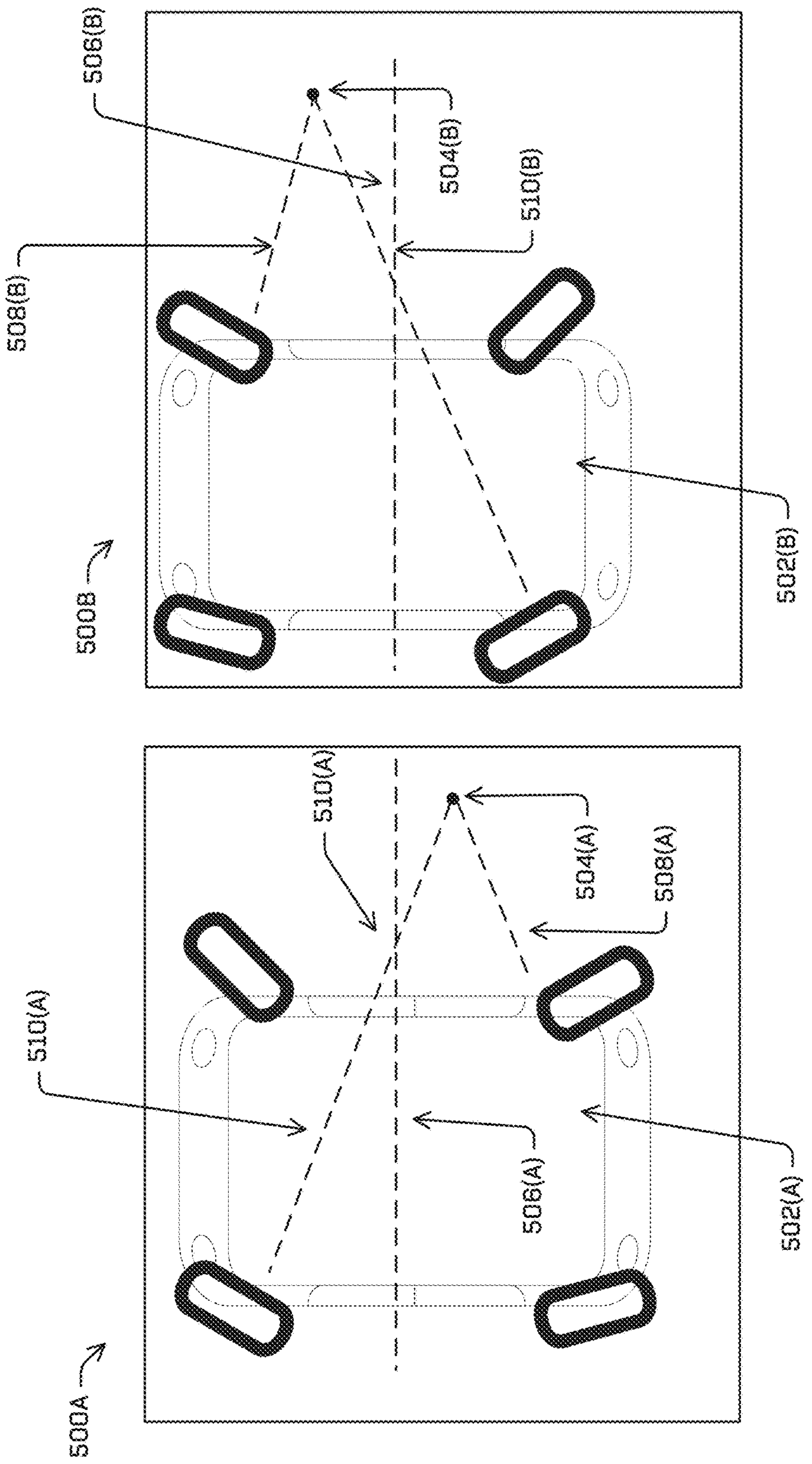
FIG. 5 provides operational examples of determining inner and outer radii based on trajectory center points.

FIG. 5 provides operational examples of determining inner and outer radii based on trajectory center points. In some cases, the inner radius of an inner trajectory circle is a line that crosses the circle's trajectory center point and a point associated with the most proximate wheel of the vehicle. In some cases, the outer radius of an outer trajectory circle is a line that crosses the circle's trajectory center point and a point associated with the most distant wheel of the vehicle. In some cases, the positioning and/or orientation of the inner and/or outer radii depends on the positioning of the trajectory center point.

For example, in the operational example 500A, because the trajectory center point 504(A) is below a medial horizontal axis 506(A) of the depicted vehicle 502(A): (i) the inner radius 508(A) crosses the trajectory center point 504(A) and the rear-right wheel of the vehicle 502(A), and (ii) the outer radius 508(A) crosses the trajectory center point 504(A) and the front-left wheel of the vehicle 502(A). The medial horizontal axis 506(A) may, for example, be a horizontal axis that is perpendicular to the vehicle's vertical axis and passes through a point that is substantially at the midpoint between the front and rear axles of the vehicle.

As another example, in the operational example 500B, because the trajectory center point 504(B) is above a medial horizontal axis 506(B) of the depicted vehicle 502(B):(i) the inner radius 508(B) crosses the trajectory center point 504

(B) and the front-right wheel of the vehicle 502(B), and(ii) the outer radius 508(B) crosses the trajectory center point 504(B) and the rear-left wheel of the vehicle 502(B). The medial horizontal axis 506(B) may, for example, be a horizontal axis that is perpendicular to the vehicle's vertical axis and passes through a point that is substantially at the midpoint between the front and rear axles of the vehicle.

Figure 6:
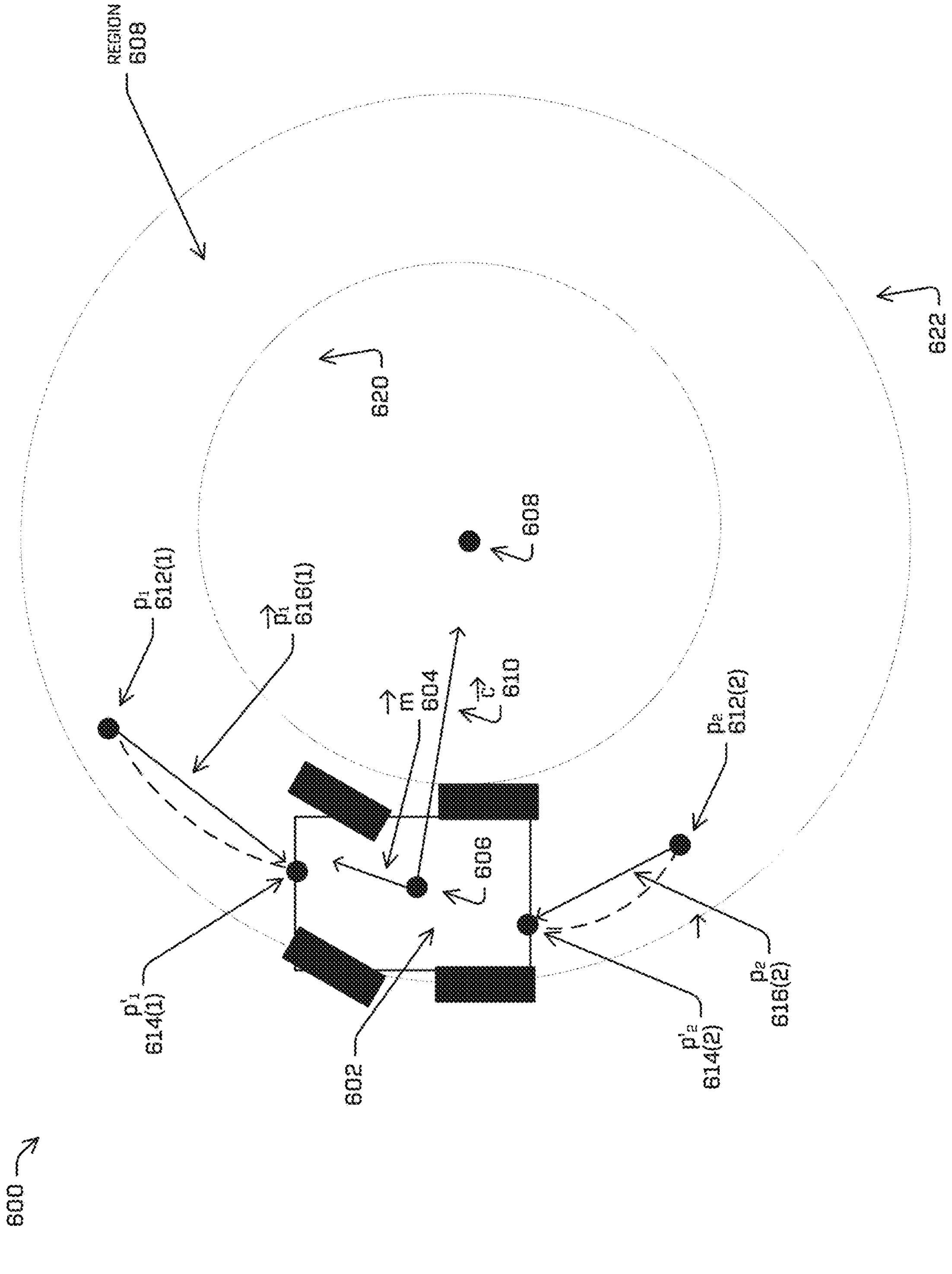
FIG. 6 provides an operational example of determining whether each of two objects are in front of or behind a vehicle.

FIG. 6 provides an operational example 600 of determining whether each of two objects are in front of or behind a vehicle 602. Specifically, in FIG. 6, a first object is detected to be located at the position 612(1) ($p_1$) and a second object is detected to be located at the position 612(2) ($p_2$). Additionally, the vehicle 602 is associated with: (i) a motion vector 604 ($\vec{m}$) that represents a direction of the movement of the vehicle 602, and (ii) a center vector 610 ($\vec{c}$) that represents a vector that crosses: (a) a point 606 that is substantially at the center of the vehicle 602 and/or the vehicle region associated with the vehicle 602, and (b) the trajectory center point 608 associated with the inner trajectory circle 620 and the outer trajectory circle 622.

In the operational example 600 of FIG. 6, to determine that the first object is in front of the vehicle, the system may: (i) project the position 612(1) ($p_1$) onto the vehicle region and/or onto the vehicle 602 to determine the projected object position 614(1) ($p'_1$), (ii) determine a vector 616(1) ($\vec{p_1}$) that crosses the position 612(1) ($p_1$) and the projected object position 614(1) ($p'_1$), (iii) determine a dot product of the motion vector 604 ($\vec{m}$) and the vector 616(1) ($\vec{p_1}$), and/or (iv) determine that the dot product is negative.

Additionally, to determine that the first object is behind the vehicle, the system may: (i) project the position 612(2) ($p_2$) onto the vehicle region and/or onto the vehicle 602 to determine the projected object position 614(2) ($p'_2$), (ii) determine a vector 616(2) ($\vec{p_2}$) that crosses the position 612(2) ($p_2$) and the projected object position 614(2) ($p'_2$), (iii) determine a dot product of the motion vector 604 ($\vec{m}$) and the vector 616(2) ($\vec{p_2}$), and/or (iv) determine that the dot product is positive.

Figure 7:
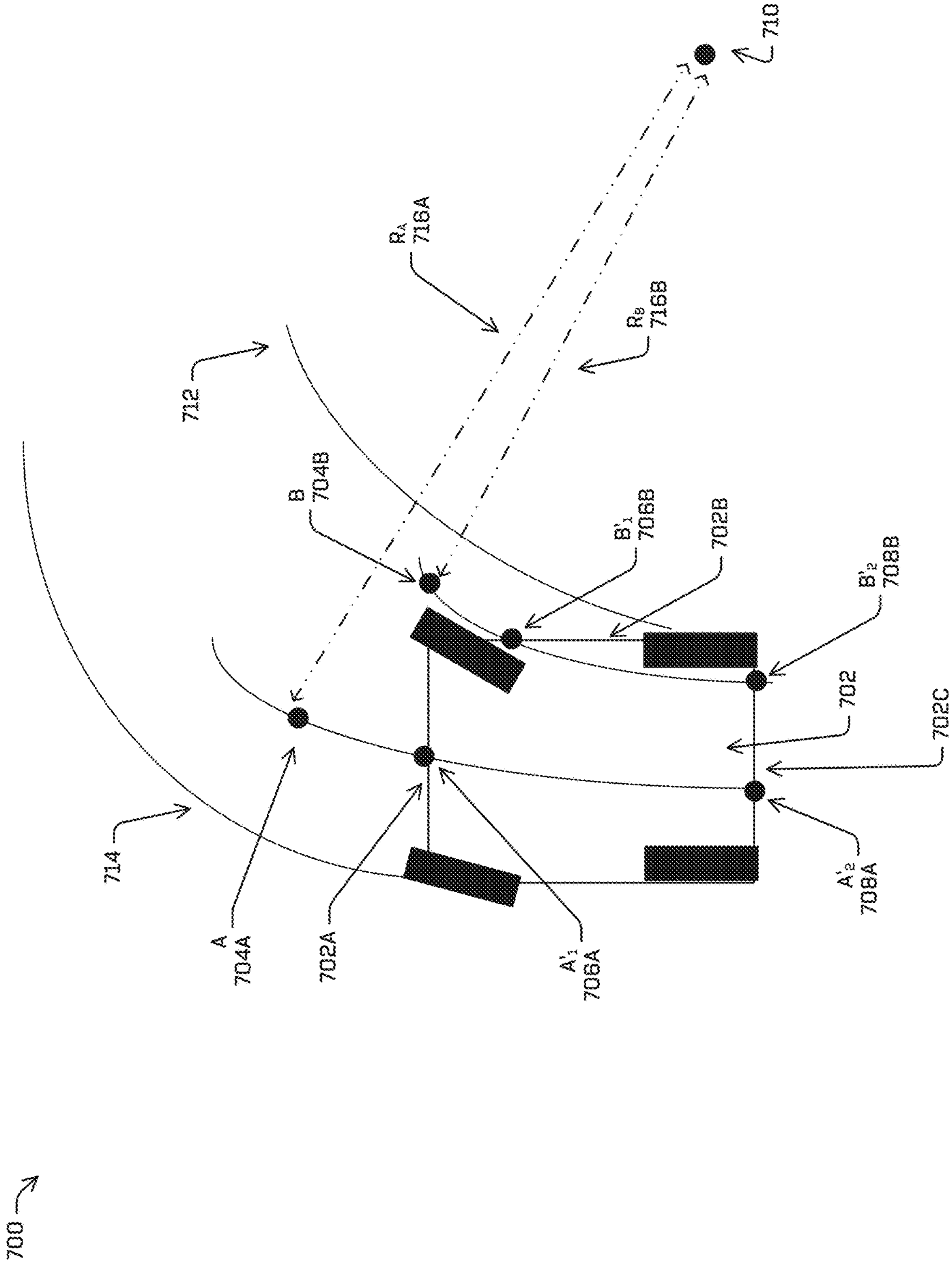
FIG. 7 provides an operational example of determining initial intersection points associated with two objects in a vehicle's environment.

FIG. 7 provides an operational example 700 of determining initial intersection points associated with two objects in an environment of a vehicle 702. Specifically, the operational example 700 depicts that a first object is at a point 704A (A), while a second object B is at a point 704B (B). The system may project the point 704A (A) along a curve that is parallel to the inner trajectory circle 712 and/or the outer trajectory circle 714 to determine the point 706A ($A'_1$) and the point 708B ($A'_2$). The point 706A ($A'_1$) may be the point in which projection of the point 704A (A) along the described curve intersects with a front horizontal edge 702A of the vehicle's region. The point 708A ($A'_2$) may be the point in which projection of the point 704A (A) along the described curve intersects with a rear horizontal edge 702C of the vehicle's region.

To determine the point 706A ($A'_1$), the system may: (i) determine a horizontal line parallel to the front horizontal edge 702A, (ii) determine a projection circle centered at the trajectory center point 710 and with a radius determined based on the distance 716A between the trajectory center point 710 and the point 704A (A), and (iii) determine an intersection point associated with the horizontal line and the projection circle, for example using one or more of the Equations 10-11 described above. To determine the point 708A ($A'_2$), the system may: (i) determine a horizontal line parallel to the rear horizontal edge 702C, (ii) determine a projection circle centered at the trajectory center point 710 and with a radius determined based on the distance 716A between the trajectory center point 710 and the point 704A (A), and (iii) determine an intersection point associated with the horizontal line and the projection circle, for example using one or more of the Equations 10-11 described above.

In some cases, after determining a set of intersection points based on the techniques described in the preceding paragraph, the system may adopt those intersection points as potential intersection points. Afterward, the system may determine a potential intersection point having the lowest arclength with respect to the point 704A (A) as the initial intersection point associated with the first object. For example, in the operational example of FIG. 7, the system may determine that the arclength between the point 704A (A) and the point 706A ($A'_1$) is lower than the arclength between the point 704A (A) and the point 708A ($A'_2$). Accordingly, the system may adopt the point 706A ($A'_1$) as the initial intersection point associated with the first object.

Additionally, the system may project the point 704B (B) along a curve that is parallel to the inner trajectory circle 712 and/or the outer trajectory circle 714 to determine the point 706B ($B'_1$) and the point 708B ($B'_2$). The point 706B ($B'_1$) may be the point in which projection of the point 704B (B) along the described curve intersects with the right vertical edge 702B of the vehicle region. The point 708B ($B'_2$) may be the point in which projection of the point 704B (B) along the described curve intersects with the rear horizontal edge 702C of the vehicle region.

To determine the point 706B ($B'_1$), the system may: (i) determine a vertical line parallel to the right vertical edge 702B, (ii) determine a projection circle centered at the trajectory center point 710 and with a radius determined based on the distance 716B between the trajectory center point 710 and the point 704B (B), and (iii) determine an intersection point associated with the horizontal line and the projection circle, for example using one or more of the Equations 12-13 described above. To determine the point 708B ($B'_2$), the system may: (i) determine a horizontal line parallel to the rear horizontal edge 702C, (ii) determine a projection circle centered at the trajectory center point 710 and with a radius determined based on the distance 716B between the trajectory center point 710 and the point 704B (B), and (iii) determine an intersection point associated with the horizontal line and the projection circle, for example using one or more of the Equations 10-11 described above.

In some cases, after determining a set of intersection points based on the techniques described in the preceding paragraph, the system may adopt those intersection points as potential intersection points. Afterward, the system may determine a potential intersection point having the lowest arclength with respect to the point 704B (B) as the initial intersection point associated with the first object. For example, in the operational example of FIG. 7, the system may determine that the arclength between the point 704B (B) and the point 706B ($B'_1$) is lower than the arclength between the point 704B (B) and the point 708B ($B'_2$). Accordingly, the system may adopt the point 706B ($B'_1$) as the initial intersection point associated with the first object.

Figure 8:
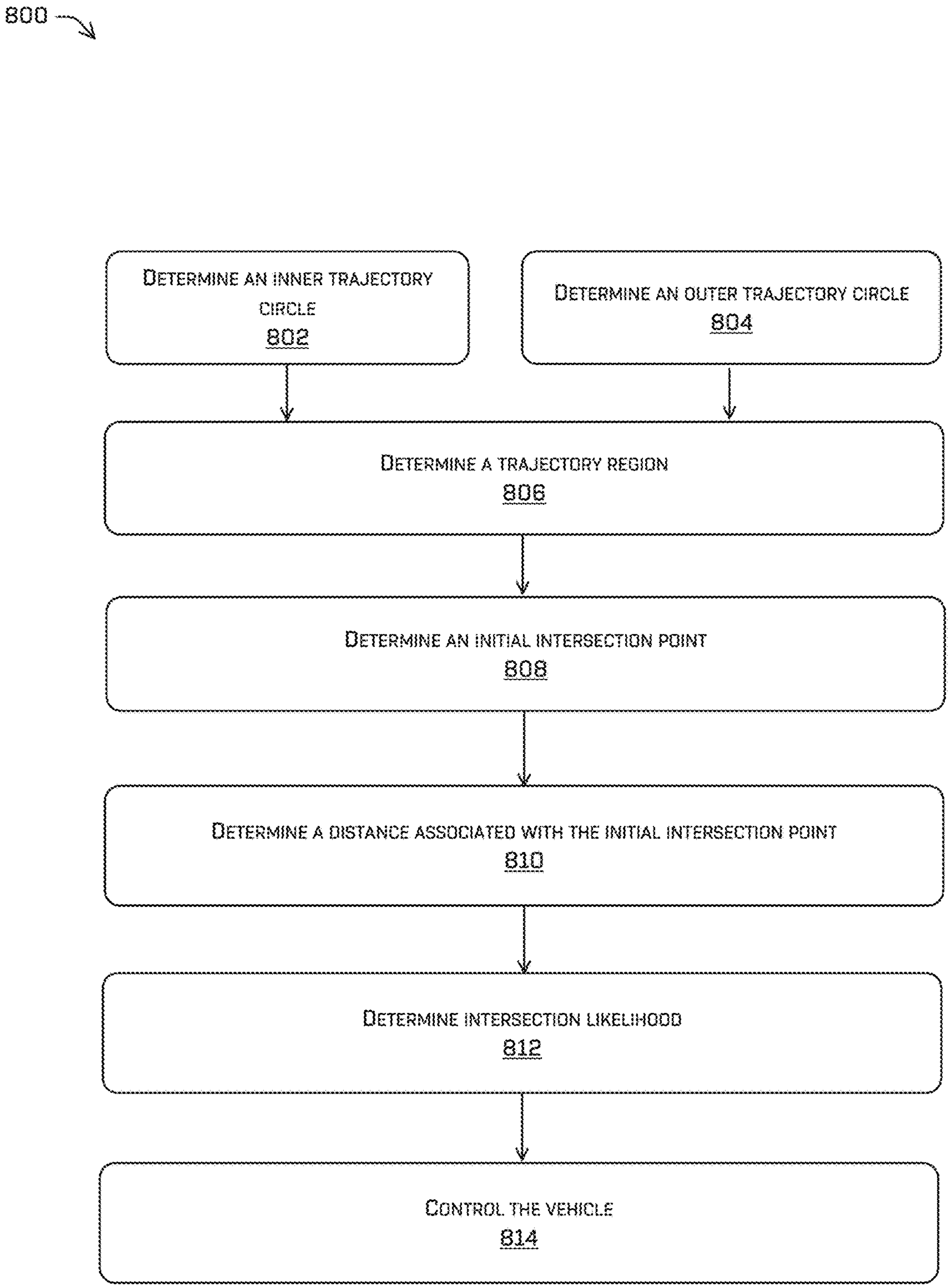
FIG. 8 is a flowchart diagram of an example process for controlling a vehicle based on a trajectory region.

FIG. 8 is a flowchart diagram of an example process 800 for controlling a vehicle based on a trajectory region. As depicted in FIG. 8, at operation 802, an example system determines an inner trajectory circle. Example techniques for determining an inner trajectory circle are described above.

At operation 804, the system determines an outer trajectory circle. Example techniques for determining an outer trajectory circle are described above.

At operation 806, the system determines a trajectory region based on the inner trajectory circle and the outer trajectory circle. In some cases, the system determines the trajectory region to include a portion of the environment that falls between the inner trajectory circle and the outer trajectory circle. Example techniques for determining a trajectory region are described above.

At operation 808, the system determines an initial intersection point associated with the vehicle. The initial intersection point may represent a point on the vehicle that is expected to first intersect with the object if the vehicle follows the current detected trajectory. Example techniques for determining an initial intersection point associated with a vehicle are described above.

At operation 810, the system determines a distance associated with the initial inspection point and the object position. In some cases, the system determines the distance based on an arclength associated with a projection of the object position onto a trajectory curve associated with the vehicle's trajectory region. Example techniques for determining a distance associated with a vehicle's initial intersection point and an object's position are described above.

At operation 812, the system determines a prediction about a likelihood that the vehicle's trajectory intersects with the object. In some cases, the system determines the likelihood prediction based on the stopping distance associated vehicle and the distance determine that the operation 808. Example techniques for determining a stopping distance associated with the vehicle and for determining a prediction about likelihood of intersection between a vehicle's trajectory and an object are described above.

At operation 814, the system controls the vehicle based on the likelihood. In some cases, if the system determines that the vehicle's trajectory is likely to intersect with the object (e.g., that the determined likelihood exceeds a threshold), the system performs one or more preventive actions. Examples of preventive actions and example techniques for controlling a vehicle based on an intersection likelihood are described above.

Figure 9:
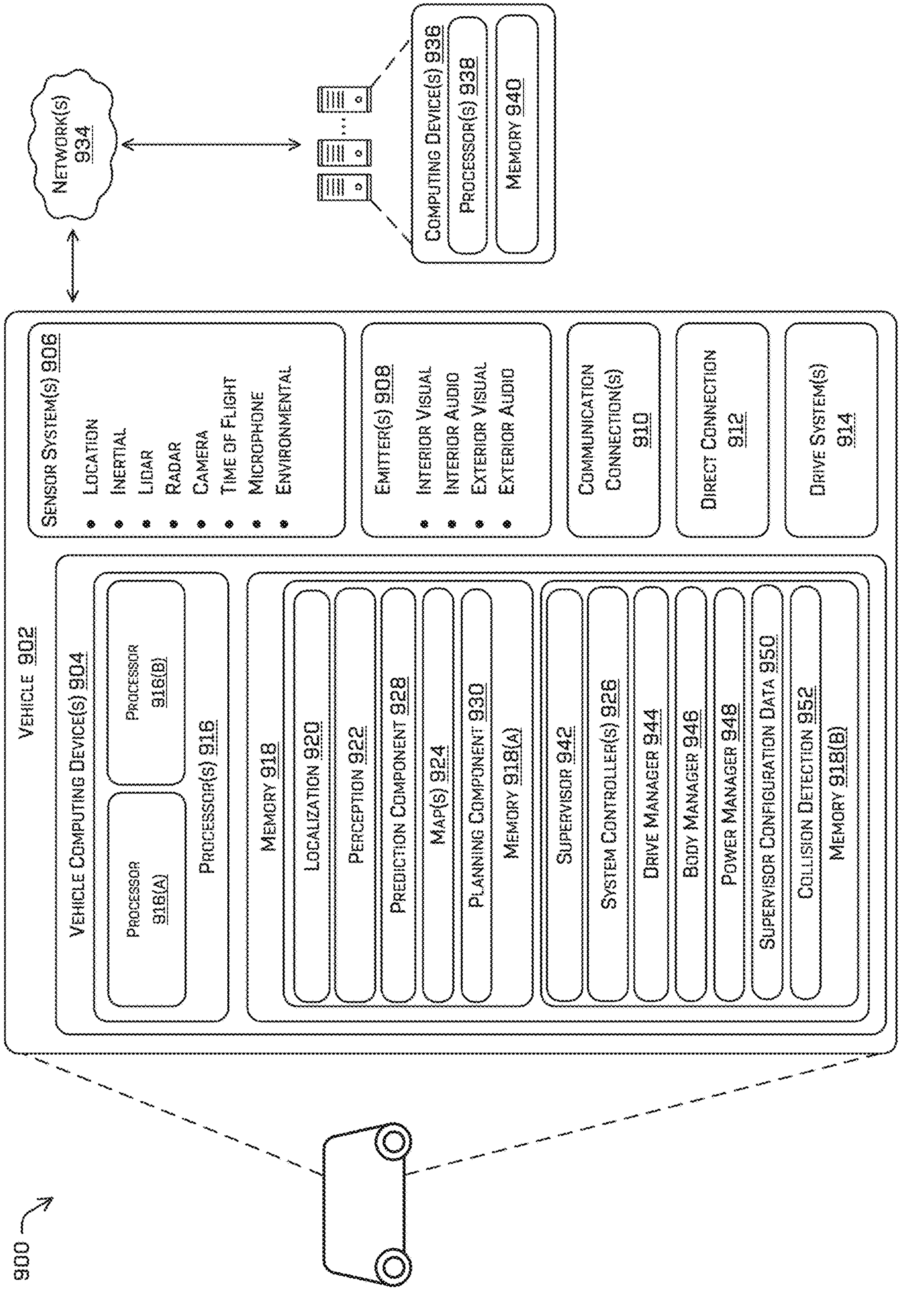
FIG. 9 is a block diagram of an example system for implementing various techniques described herein.

FIG. 9 is associated with a block diagram of an example system 900 for implementing various techniques described herein. In some instances, the example system 900 may include a vehicle 902. In some instances, the vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 902 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 902 can be configured to perform various techniques described herein, including detecting sensor data inconsistencies by comparing the sensor data in overlapping regions captured by different sensors. The vehicle 902 also may be configured to determine causes of sensor data inaccuracies and/or responses by the vehicle 902 to the sensor data inaccuracies, using the various techniques described herein.

The vehicle 902 may include vehicle computing device(s) 904, sensor(s) 906, emitter(s) 908, network interface(s) 910, at least one direct connection 912 (e.g., for physically coupling with the vehicle to exchange data and/or to provide power), and one or more drive system(s) 914. The system 900 may additionally or alternatively comprise vehicle computing device(s) 904.

In some instances, the sensor(s) 906 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 906 may include multiple instances of each of these or other types of sensors. For instance, the radar sensors may include individual radar sensors located at the corners, front, back, sides, and/or top of the vehicle 902. As another example, the cameras may include multiple cameras disposed at various locations about the exterior and/or interior of the vehicle 902. The sensor(s) 906 may provide input to the vehicle computing device(s) 904 and/or to computing device(s) 936.

The vehicle 902 may also include emitter(s) 908 for emitting light and/or sound, as described above. The emitter(s) 908 in this example may include interior audio and visual emitter(s) to communicate with passengers of the vehicle 902. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 908 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns, and/or the like) to audibly communicate with pedestrians or other nearby vehicles, one or more of which comprising acoustic beam steering technology.

The vehicle 902 may also include network interface(s) 910 that enable communication between the vehicle 902 and one or more other local or remote computing device(s). For instance, the network interface(s) 910 may facilitate communication with other local computing device(s) on the vehicle 902 and/or the drive systems(s) 914. Also, the network interface(s) 910 may additionally or alternatively allow the vehicle to communicate with other nearby computing device(s) (e.g., other nearby vehicles, traffic signals, etc.). The network interface(s) 910 may additionally or alternatively enable the vehicle 902 to communicate with computing device(s) 936. In some examples, computing device(s) 936 may comprise one or more nodes of a distributed computing system (e.g., a cloud computing architecture).

The network interface(s) 910 may include physical and/or logical interfaces for connecting the vehicle computing device(s) 904 to another computing device or a network, such as network(s) 934. For example, the network interface(s) 910 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 904 and/or the sensor(s) 906 may send sensor data, via the network(s) 934, to the computing device(s) 936 at a particular frequency, after a lapse of a predetermined period of time, in near real-time, etc.

In some instances, the vehicle 902 may include one or more drive systems(s) 914 (or drive components). In some instances, the vehicle 902 may have a single drive system 914. In some instances, the drive system(s) 914 may include one or more sensors to detect conditions of the drive system(s) 914 and/or the surroundings of the vehicle 902. By way of example and not limitation, the sensor(s) of the drive systems(s) 914 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 914. In some cases, the sensor(s) on the drive systems(s) 914 may overlap or supplement corresponding systems of the vehicle 902 (e.g., sensor(s) 906).

The drive systems(s) 914 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 914 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 914. Furthermore, the drive systems(s) 914 may also include one or more network interface(s) that enable communication by the respective drive component with one or more other local or remote computing device(s).

The vehicle computing device(s) 904 may include processor(s) 916 and memory 918 communicatively coupled with the one or more processors 916. Computing device(s) 936 may also include processor(s) 938, and/or memory 940.

The processor(s) 916 and/or 938 may be any suitable processor capable of executing computer-executable instructions to process data and perform operations as described herein. By way of example and not limitation, the processor(s) 916 and/or 938 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 918 and/or 940 may be examples of non-transitory computer-readable media. The memory 918 and/or 940 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 918 and/or memory 940 may store a localization component 920, perception component 922, maps 924, system controller(s) 926, prediction component 928, and/or planning component 930.

In at least one example, the localization component 920 may include hardware and/or software to receive data from the sensor(s) 906 to determine a position, velocity, and/or orientation of the vehicle 902 (e.g., one or more of an x-, y-, z-position, roll, pitch, or yaw). For example, the localization component 920 may include map(s) of an environment and can continuously determine a location, velocity, and/or orientation of the autonomous vehicle within the map(s). In some instances, the localization component 920 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 920 may provide data to various components of the vehicle 902 to determine an initial position of an autonomous vehicle for generating a trajectory and/or for generating map data, as discussed herein. In some examples, localization component 920 may provide, to the planning component 930 and/or to the prediction component 928, a location and/or orientation of the vehicle 902 relative to the environment and/or sensor data associated therewith.

The memory 918 can further include one or more maps 924 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 924 may include at least one map (e.g., images and/or a mesh) generated in accordance with the techniques discussed herein. In some examples, the vehicle 902 can be controlled based at least in part on the maps 924. That is, the maps 924 can be used in connection with the localization component 920, the perception component 922, and/or the planning component 930 to determine a location of the vehicle 902, identify objects in an environment, and/or generate routes and/or trajectories to navigate within an environment.

In some instances, the perception component 922 may comprise a primary perception system and/or a prediction system implemented in hardware and/or software. The perception component 922 may detect object(s) in in an environment surrounding the vehicle 902 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 922 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 928 may include functionality to generate predicted information associated with objects in an environment. As an example, the prediction component 928 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 902 traverses an environment. In some examples, the prediction component 928 can generate one or more predicted positions, predicted velocities, predicted trajectories, etc., for such target objects based on attributes of the target object and/or other objects proximate the target object.

The planning component 930 may receive a location and/or orientation of the vehicle 902 from the localization component 920, perception data from the perception component 922, and/or predicted trajectories from the prediction component 928, and may determine instructions for controlling operation of the vehicle 902 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 926 and/or drive systems(s) 914 may parse/cause to be carried out, second instructions for the emitter(s) 908 may be formatted according to a second format associated therewith). In at least one example, the planning component 930 may comprise a nominal trajectory generation subcomponent that generates a set of candidate trajectories, and selects a trajectory for implementation by the drive systems(s) 914 based at least in part on determining a cost associated with a trajectory according to U.S. patent application Ser. No. 16/517,506, filed Jul. 19, 2019 and/or U.S. patent application Ser. No. 16/862,284, filed May 11, 2020, the entirety of which are incorporated by reference herein in their entireties and for all purposes.

The memory 918 and/or 940 may additionally or alternatively store a mapping system (e.g., generating a map based at least in part on sensor data), a planning system, a ride management system, etc. Although localization component 920, perception component 922, the prediction component 928, the planning component 930, and/or system controller(s) 926 are illustrated as being stored in memory 918, any of these components may include processor-executable instructions, machine-learned model(s) (e.g., a neural network), and/or hardware and all or part of any of these components may be stored on memory 940 or configured as part of computing device(s) 936.

As described herein, the localization component 920, the perception component 922, the prediction component 928, the planning component 930, and/or other components of the system 900 may comprise one or more ML models. For example, the localization component 920, the perception component 922, the prediction component 928, and/or the planning component 930 may each comprise different ML model pipelines. The prediction component 928 may use a different ML model or a combination of different ML models in different circumstances. For example, the prediction component 928 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 918 may additionally or alternatively store one or more system controller(s) 926, which may be configured to control steering, propulsion, braking, safety, emitters, communication, and other systems of the vehicle 902. These system controller(s) 926 may communicate with and/or control corresponding systems of the drive systems(s) 914 and/or other components of the vehicle 902.

In an additional or alternate example, vehicle 902 and/or computing device(s) 936 may communicate (e.g., transmit and/or receive messages over network(s) 934) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 902. For example, the passenger device may additionally or alternatively comprise a display and/or one or more input/output devices, such as a touchscreen, microphone, speaker, and/or the like. In some examples, the vehicle 902 may transmit messages and/or receive messages from the passenger device.

The processor(s) 916 include processor 916(A) and processor 916(B). However, a person of ordinary skill in the relevant technology will recognize that the processor(s) 916 may include other processing units other than and/or in addition to the processor 916(A) and/or processor 916(B). For example, processor 916(A) may be associated with a low-level controller, while processor 916(B) may be associated with a high-level controller.

The memory 918 includes a memory 918(A) and a memory 918(B). However, a person of ordinary skill in the relevant technology will recognize that the memory 918 may include other processing units other than and/or in addition to the memory 918(A) and/or memory 918(B). For example, memory 918(A) may be associated with a low-level controller, while memory 918(B) may be associated with a high-level controller. In some cases, at least one of the processor 916(A) or the memory 918(A) is safety-critical and/or automotive-grade. In some cases, at least one of the processor 916(B) or the memory 918(B) is non-safety-critical and/or non-automotive-grade.

The memory 916(B) includes localization component 920, perception component 922, maps 924, prediction component 928, and/or planning component 930, while processor 916(A) includes a supervisor 942, the system controllers 926, a drive manager 944, a body manager 946, a power manager 948, supervisor configuration data 950, and a collision detection component 952. However, a person of ordinary skill in the relevant technology will recognize that other arrangements and/or architecture of the vehicle computing device(s) and/or the memory 918 are possible.

In some cases, the drive manager 944 is configured to control the drive system(s) associated with the vehicle based on output data (e.g., trajectories) generated by the planning component. The drive manager 944 may translate the output data into low-level commands that may be executed by the drive system(s) associated with the vehicle to control the vehicle's driving functions (e.g., motion, steering, braking, and/or the like).

The body manager 946 may be configured to control one or more body-related functions of the vehicle, such as functions related to the heating, ventilation, and air conditioning (HVAC) system, lighting system, doors, windows, and/or the like. The body manager 946 may receive high-level commands from the processor 916(B) and/or other sources. The body manager 946 may be configured to translate these high-level commands into low-level commands that can be executed by the relevant physical component(s) of the vehicle.

The power manager 948 may be configured to manage one or more power systems of the vehicle. For example, the power manager 948 may be configured to manage charging of the power source(s) of the vehicle. As another example, the power manager 948 may be configured to manage (e.g., control and/or monitor) power distribution to one or more components of the vehicle.

The supervisor 942 may be configured to manage execution of a set of software applications (e.g., the drive manager 944, the body manager 946, and the power manager 948) on the computing resources associated with the processor 916(A). For example, the supervisor 942 may be configured to manage execution of the set of software applications based on the current operational mode of the vehicle. As another example, the supervisor 942 may be configured to manage the vehicle's operational state (e.g., to determine which operational mode the vehicle is in and/or to determine when to enable transitions between operational modes). As another example, the supervisor 942 may be configured to determine a launch arrangement for a set of software applications (e.g., a set of software applications that are permitted to be executed during a current operational state), for example based on operational dependency relationships between software applications and/or based on required minimum launch delay periods associated with software applications.

In some cases, the supervisor 942 may manage execution of a set of software applications (e.g., the drive manager 944, the body manager 946, and the power manager 948) on the computing resources of processor 916(A) based on supervisor configuration data 950 stored on the memory 918(A). The supervisor configuration data 950 may define: (i) mappings of software application sets to operational modes, (ii)

transition requirements for transitions between operational modes, and/or (iii) operational dependency relationships and/or minimum launch delay periods associated with software applications.

The collision detection component 952 may be configured to determine a prediction about a likelihood that a vehicle's trajectory is expected to intersect with (e.g., the vehicle's trajectory is expected to intersect with) an object in the vehicle's environment. This prediction may be determined, for example, based on the techniques described above (e.g., in relation to FIGS. 1-8).

It should be noted that while FIG. 9 is illustrated as a distributed system, in alternative examples, components of the vehicle 902 may be associated with the computing device(s) 936 and/or components of the computing device(s) 936 may be associated with the vehicle 902. That is, the vehicle 902 may perform one or more of the functions associated with the computing device(s) 936, and vice versa.

Figure 10:
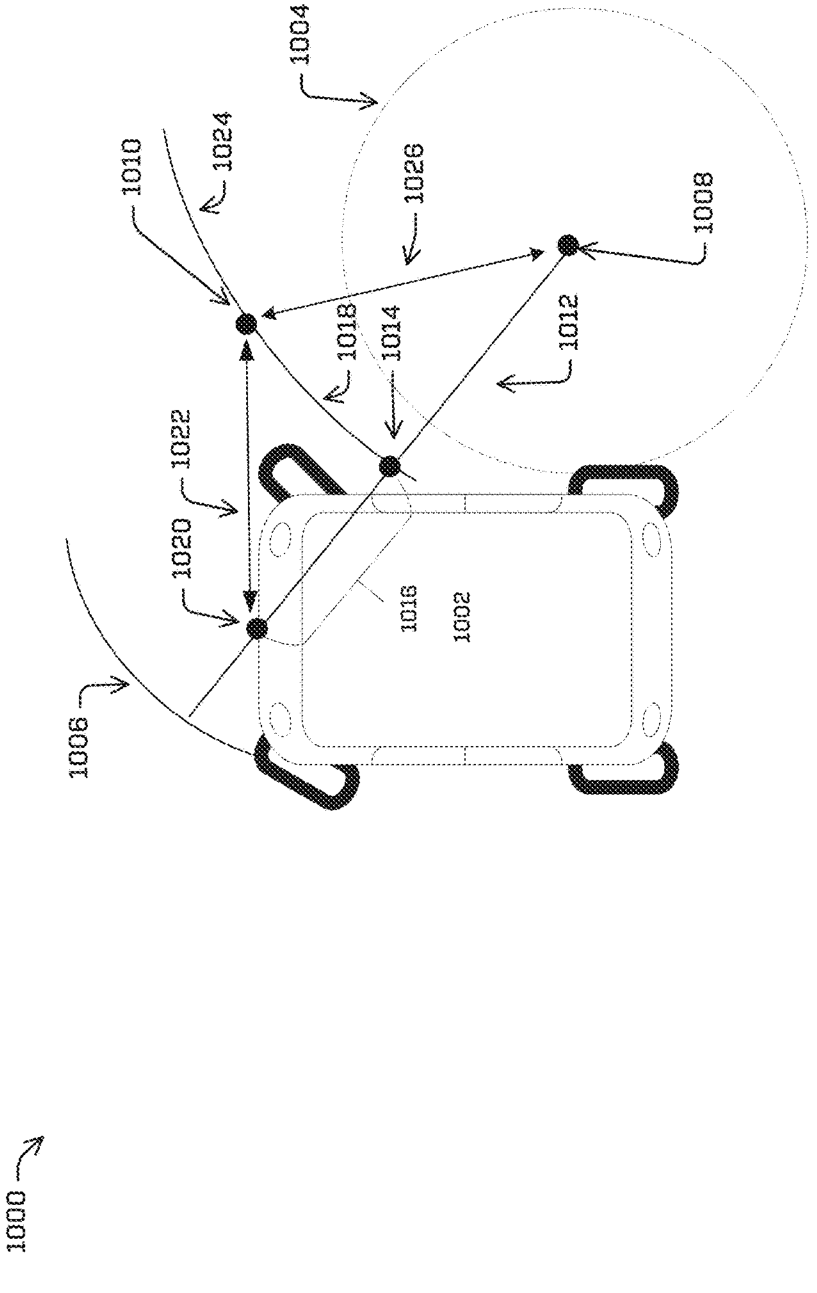
FIG. 10 provides an operational example of determining the distance associated with a vehicle and an object.

FIG. 10 provides an operational example 1000 of determining the distance between a vehicle point 1020 associated with a vehicle 1002 and an object position 1010 associated with an object in the vehicle's environment. The vehicle point 1020 may be, for example, the initial intersection point associated with the vehicle 1002 (e.g., as determined based on the techniques described above), a predefined position of the vehicle 1002, a point of the vehicle that is closest to the object position 1010, and/or a point at a boundary of the vehicle 1002. For example, in some cases, if the object position is to the left of the vehicle position and/or in front of the vehicle (e.g., in the direction of the vehicle's movement), the vehicle point is a point that is substantially at the upper-left boundary of the vehicle. As another example, in some cases, if the object position is to the left of the vehicle position and/or behind vehicle (e.g., against the direction of the vehicle's movement), the vehicle point is a point that is substantially at the lower-left boundary of the vehicle. As another example, in some cases, if the object position is to the right of the vehicle position and/or in front of the vehicle, the vehicle point is a point that is substantially at the upper-right boundary of the vehicle. As another example, in some cases, if the object position is to the right of the vehicle position and/or behind the vehicle, the vehicle point is a point that is substantially at the lower-right boundary of the vehicle.

As depicted in FIG. 10, the vehicle is associated with a trajectory center point 1008 that is used to define the inner circle 1004 and the outer circle 1006. In some cases, to determine the distance between the vehicle point 1020 and the object position 1010, a system first projects the object position 1010 along a projection circle 1024 and/or onto a line 1012 that intersects with the vehicle point 1020 and the trajectory center point 1008. This may result in the projected object position 1014. The projection circle 1024 may be a circle centered at the trajectory center point 1008 whose radius is determined based on a distance 1026 between the trajectory center point 1008 and the object position 1010.

After determining the projected object position 1014 onto the projected object position 1014, the system determines a value 1018, which may represent an arclength of the projection circle 1024 between the object position 1010 and the projected object position 1014. The system may also determine the value 1016, which may represent a distance between the projected object position 1014 and the vehicle point 1020. The system may determine the distance between the vehicle point 1020 and the object position 1010 based on the value 1022, which may for example be determined by applying the Pythagorean theorem to the value 1016, the value 1018, and the value 1022 (e.g., given a triangle whose hypotenuse length is the value 1022 and whose other dimensions are the value 1016 and the value 1018).

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the system to perform operations comprising: receiving a steering angle, a width, and a length associated with a vehicle; determining a steering mode; determining a circle based on the steering mode, the steering angle, the width, and the length; determining a region in an environment associated with the vehicle based on the circle; based on determining that an object is within the region, determining an arclength associated with an object position associated with the object and a vehicle position associated with the vehicle; determining a stopping distance associated with the vehicle; determining first data representing that the vehicle is expected to collide with the object based on the arclength and the stopping distance; and controlling the vehicle based on the first data.

B: The system of paragraph A, wherein determining the arclength comprises: determining a first position based on a projection of a second position associated with the object along a projection circle a curve, the projection circle and the circle being centered at a third position; and determining the arclength based on first position C: The system of paragraph B, wherein determining the arclength further comprises: determining a fourth position associated with intersection of the projection with a line, the line intersecting with the first position and a fifth position associated with the vehicle; and determining the arclength based on the first position, the second position, and the projection circle.

D: The system of paragraph C, wherein determining the first data comprises: determining a distance associated with the vehicle and the object based on the arclength and a second distance, the second distance being associated with the first position and the fifth position.

E: The system of any of paragraphs A-D, wherein the steering mode comprises one of: a front two-wheel steering mode; a rear two-wheel steering mode; a four-wheel steering mode associated with two distinct steering angles; or a crab steering mode.

F: One or more non-transitory computer-readable media storing instructions executable by one or more processors, wherein the instructions, when executed, cause the one or more processors to perform operations comprising: determining a circle associated with a movement of a vehicle based on a steering angle associated with the vehicle, a width associated with the vehicle, a length associated with the vehicle, and a steering mode associated with the vehicle; based on determining that an object is within a region associated with the circle, determining a distance associated with the vehicle and the object based on the region; determining a likelihood that a vehicle trajectory intersects an object trajectory based on the distance and a stopping distance associated with the vehicle; and controlling the vehicle based on the likelihood.

G: The one or more non-transitory computer-readable media of paragraph F, wherein determining the region comprises: determining a first position based on the steering mode, the steering angle, and the length; determining a radius based on the steering mode, the steering angle, and the length; and determining that the circle is centered at the first position and has the radius.

H: The one or more non-transitory computer-readable media of paragraph G, wherein the region comprises a portion of an environment between the circle and a second circle, the second circle being associated with a second radius.

I: The one or more non-transitory computer-readable media of paragraph H, wherein determining the region comprises: determining that the steering mode is a front-wheel steering mode; determining the first position based on the steering angle and the length, the steering angle being associated with a front wheel; determining the radius based on the steering angle and the length; and determining the second radius based on the first position, the width, and the length.

J: The one or more non-transitory computer-readable media of paragraph H or I, wherein determining the region comprises: determining that the steering mode is a rear-wheel steering mode; determining the first position based on the steering angle and the length, the steering angle being associated with a rear wheel; determining the radius based on the first position and the steering angle; and determining the second radius based on the first position, the width, and the length.

K: The one or more non-transitory computer-readable media of any of paragraphs H-J, wherein determining the circle comprises: determining that the steering mode is a four-wheel steering mode associated with the steering angle and a second steering angle that is distinct from the steering angle; determining the first position based on the length, the steering angle, and the second steering angle; determining the radius based on the first position; and determining the second radius based on the first position, the width, and the length.

L: The one or more non-transitory computer-readable media of any of paragraphs H-K, wherein determining the circle comprises: determining that the steering mode is a crab steering mode; determining the first position based on the steering angle and a predetermined value; determining the radius based on the first position; and determining the second radius based on the first position, the width, and the length.

M: The one or more non-transitory computer-readable media of any of paragraphs F-L, wherein determining the distance comprises: determining a first position based on a projection of a second position associated with the object along a projection circle, the projection circle and the circle being centered at a third position; and determining the distance based on first position N: The one or more non-transitory computer-readable media of any of paragraphs F-M, the operations further comprising: determining, as a first projection, a point along a curve associated with the object, the curve being associated with a projection circle that is concentric with the circle; determining an intersection point of the curve and a bounding box associated with the vehicle; determining a vector between the first projection and the intersection point; and determining that the object is one of behind the vehicle or in front of the vehicle based on a motion vector associated with the vehicle and the vector.

O: A system comprising: one or more processors; and one or more non-transitory computer-readable media storing computer-executable instructions that, when executed, cause the system to perform operations comprising: receiving a first position associated with a vehicle and a second position associated with an object in an environment of the vehicle; determining a circle centered at a third position in the environment, wherein the second position is associated with a boundary of the circle; determining a third position based on projecting the second position along the circle and onto a line, the line intersecting with the first position and the third position; determining an arclength associated with the second position, the third position, and the circle; determining a first distance between the first position and the third position; determining a second distance based on the first distance and the arclength; and controlling the vehicle based on the second distance.

P: The system of paragraph O, wherein controlling the vehicle comprises: determining that a trajectory associated with the vehicle is unsafe based on the second distance.

Q: The system of paragraph O or P, the operations further comprising: determining the third position based on a steering angle, a width, a length, and a steering mode associated with the vehicle.

R: The system of paragraph Q, wherein determining the third position comprises: determining that the steering mode is a front-wheel steering mode; and determining the third position based on the steering angle and the length, the steering angle being associated with a front wheel.

S: The system of paragraph Q or R, wherein determining the third position comprises: determining that the steering mode is a rear-wheel steering mode; and determining the third position based on the steering angle and the length, the steering angle being associated with a rear wheel.

T: The system of any of paragraphs Q-S, wherein determining the third position comprises: determining that the steering mode is a four-wheel steering mode associated with the steering angle and a second steering angle that is distinct from the steering angle; determining the third position based on the length, the steering angle, and the second steering angle.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the system to perform operations comprising:

receiving a steering angle, a width, and a length associated with a vehicle;

determining a steering mode;

determining a circle based on the steering mode, the steering angle, the width, and the length;

determining a region in an environment associated with the vehicle based on the circle;

based on determining that an object is within the region, determining an arclength associated with an object position associated with the object and a vehicle position associated with the vehicle;

determining a stopping distance associated with the vehicle;

determining first data representing that the vehicle is expected to collide with the object based on the arclength and the stopping distance; and controlling the vehicle based on the first data.

2. The system of claim 1, wherein determining the arclength comprises:

determining a first position based on a projection of a second position associated with the object along a projection circle, the projection circle and the circle being centered at a third position; and determining the arclength based on the first position.

3. The system of claim 2, wherein determining the arclength further comprises:

determining a fourth position associated with intersection of the projection with a line, the line intersecting with the first position and a fifth position associated with the vehicle; and determining the arclength based on the first position, the second position, and the projection circle.

4. The system of claim 3, wherein determining the first data comprises:

determining a distance associated with the vehicle and the object based on the arclength and a second distance, the second distance being associated with the first position and the fifth position.

5. The system of claim 1, wherein the steering mode comprises one of:

a front two-wheel steering mode;

a rear two-wheel steering mode;

a four-wheel steering mode associated with two distinct steering angles; or a crab steering mode.

6. One or more non-transitory computer-readable media storing instructions executable by one or more processors, wherein the instructions, when executed, cause the one or more processors to perform operations comprising:

determining a circle associated with a movement of a vehicle based on a steering angle associated with the vehicle, a width associated with the vehicle, a length associated with the vehicle, and a steering mode associated with the vehicle;

based on determining that an object is within a region associated with the circle, determining a distance associated with the vehicle and the object based on the region;

determining a likelihood that a vehicle trajectory intersects an object trajectory based on the distance and a stopping distance associated with the vehicle; and controlling the vehicle based on the likelihood.

7. The one or more non-transitory computer-readable media of claim 6, wherein determining the region comprises:

determining a first position based on the steering mode, the steering angle, and the length;

determining a radius based on the steering mode, the steering angle, and the length; and determining that the circle is centered at the first position and has the radius.

8. The one or more non-transitory computer-readable media of claim 7, wherein the region comprises a portion of an environment between the circle and a second circle, the second circle being associated with a second radius.

9. The one or more non-transitory computer-readable media of claim 8, wherein determining the region comprises:

determining that the steering mode is a front-wheel steering mode;

determining the first position based on the steering angle and the length, the steering angle being associated with a front wheel;

determining the radius based on the steering angle and the length; and determining the second radius based on the first position, the width, and the length.

10. The one or more non-transitory computer-readable media of claim 8, wherein determining the region comprises:

determining that the steering mode is a rear-wheel steering mode;

determining the first position based on the steering angle and the length, the steering angle being associated with a rear wheel;

determining the radius based on the first position and the steering angle; and determining the second radius based on the first position, the width, and the length.

11. The one or more non-transitory computer-readable media of claim 8, wherein determining the circle comprises:

determining that the steering mode is a four-wheel steering mode associated with the steering angle and a second steering angle that is distinct from the steering angle;

determining the first position based on the length, the steering angle, and the second steering angle;

determining the radius based on the first position; and determining the second radius based on the first position, the width, and the length.

12. The one or more non-transitory computer-readable media of claim 8, wherein determining the circle comprises:

determining that the steering mode is a crab steering mode;

determining the first position based on the steering angle and a predetermined value;

determining the radius based on the first position; and determining the second radius based on the first position, the width, and the length.

13. The one or more non-transitory computer-readable media of claim 6, wherein determining the distance comprises:

determining a first position based on a projection of a second position associated with the object along a projection circle, the projection circle and the circle being centered at a third position; and determining the distance based on the first position.

14. The one or more non-transitory computer-readable media of claim 6, the operations further comprising:

determining, as a first projection, a point along a curve associated with the object, the curve being associated with a projection circle that is concentric with the circle;

determining an intersection point of the curve and a bounding box associated with the vehicle;

determining a vector between the first projection and the intersection point; and determining that the object is one of behind the vehicle or in front of the vehicle based on a motion vector associated with the vehicle and the vector.

15. A system comprising:

one or more processors; and one or more non-transitory computer-readable media storing computer-executable instructions that, when executed, cause the system to perform operations comprising:

receiving a first position associated with a vehicle and a second position associated with an object in an environment of the vehicle;

determining, based on a steering mode of the vehicle, a circle centered at a third position in the environment, wherein the second position is associated with a boundary of the circle;

determining a fourth position based on projecting the second position along the circle and onto a line, the line intersecting with the first position and the third position;

determining an arclength associated with the second position, the third position, the fourth position, and the circle;

determining a first distance between the first position and the third position;

determining a second distance based on the first distance and the arclength; and controlling the vehicle based on the second distance.

16. The system of claim 15, wherein controlling the vehicle comprises:

determining that a trajectory associated with the vehicle is unsafe based on the second distance.

17. The system of claim 15, the operations further comprising:

determining the third position based on a steering angle, a width, and a length.

18. The system of claim 17, wherein determining the third position comprises:

determining that the steering mode is a front-wheel steering mode; and determining the third position based on the steering angle and the length, the steering angle being associated with a front wheel.

19. The system of claim 17, wherein determining the third position comprises:

determining that the steering mode is a rear-wheel steering mode; and determining the third position based on the steering angle and the length, the steering angle being associated with a rear wheel.

20. The system of claim 17, wherein determining the third position comprises:

determining that the steering mode is a four-wheel steering mode associated with the steering angle and a second steering angle that is distinct from the steering angle;

determining the third position based on the length, the steering angle, and the second steering angle.

* * * * *